June 23, 1970  E. O. MARTINSON ETAL  3,516,462
APPARATUS FOR HARVESTING TREES
Filed May 4, 1967  21 Sheets-Sheet 1

INVENTORS
EDWIN O. MARTINSON
PHILIP A. HUFFAKER
BY
ATTORNEY

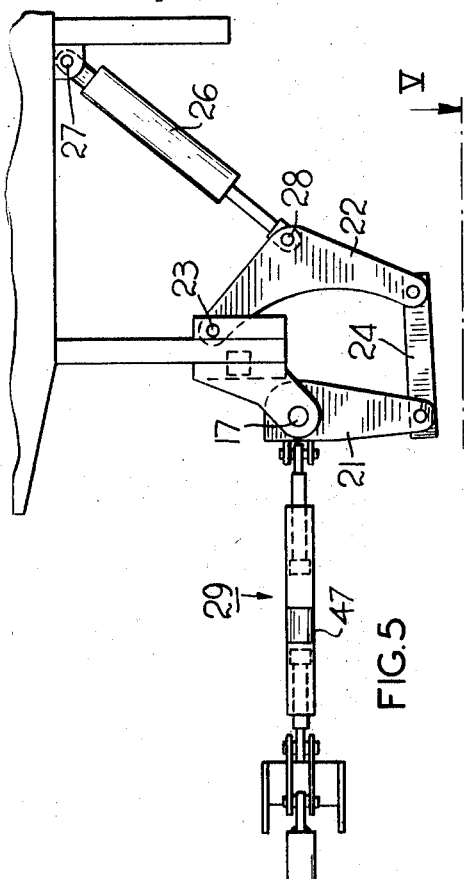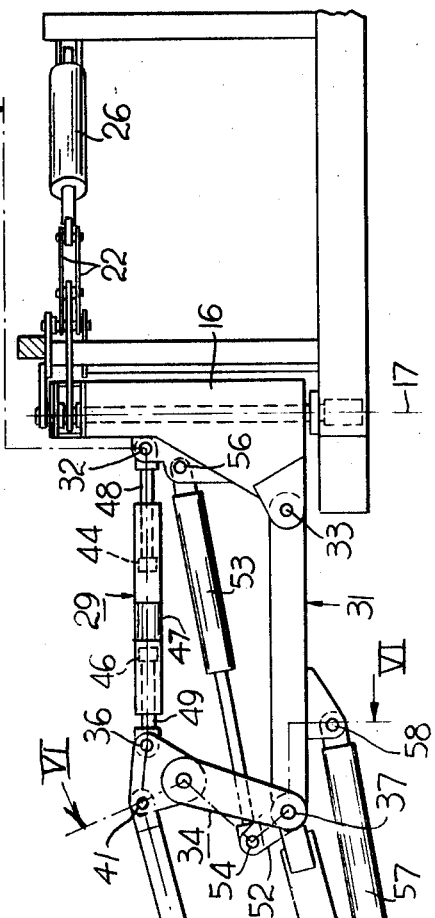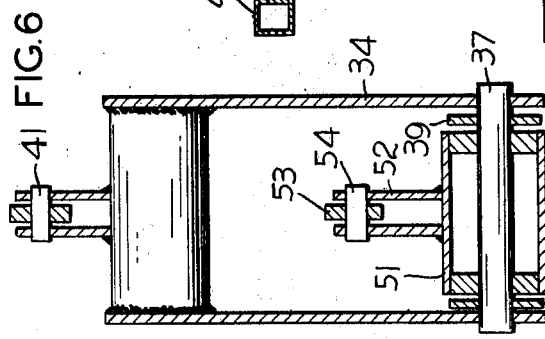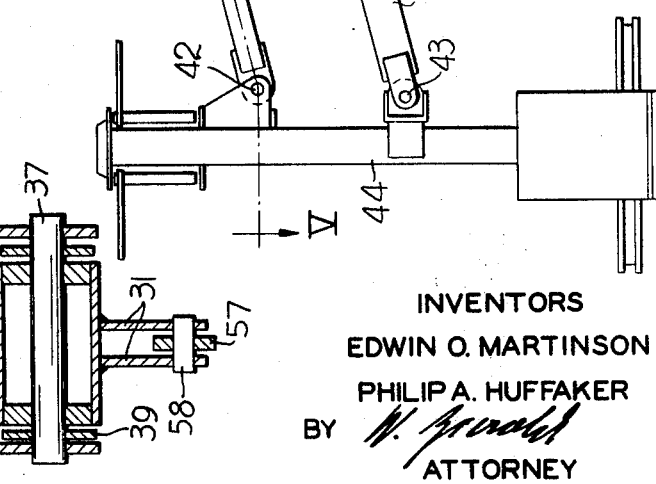

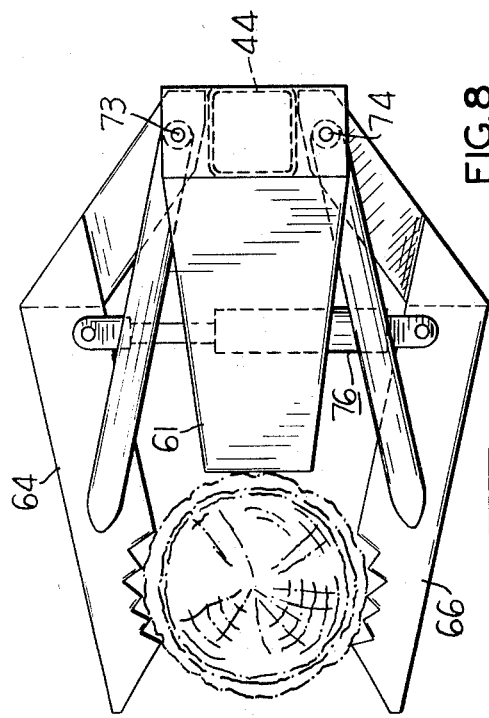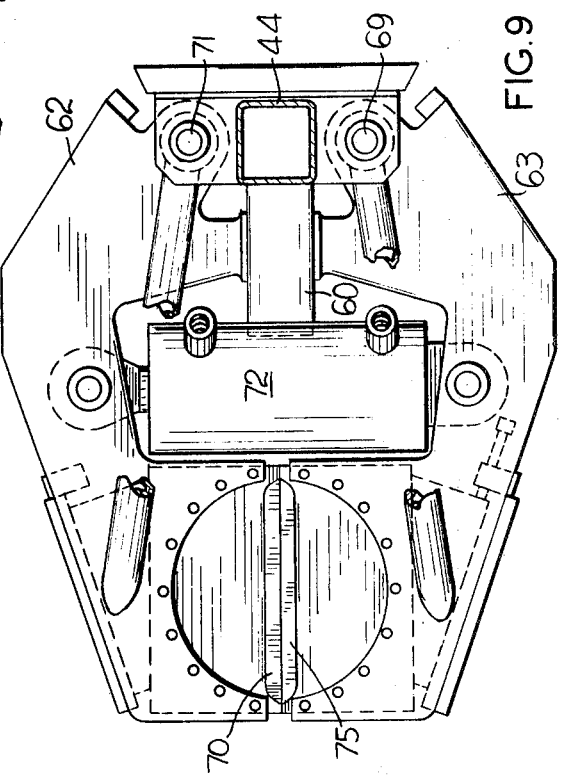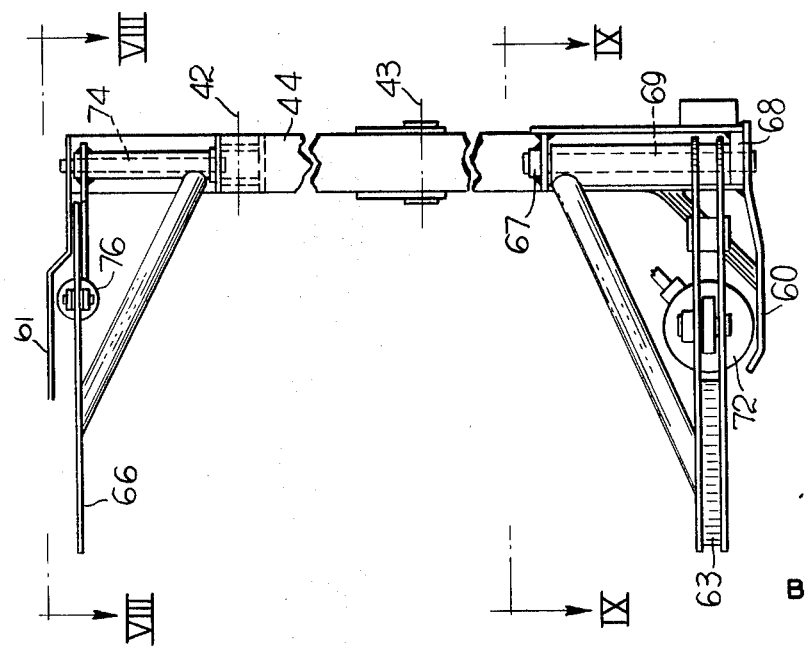

June 23, 1970 — E. O. MARTINSON ET AL — 3,516,462
APPARATUS FOR HARVESTING TREES
Filed May 4, 1967 — 21 Sheets-Sheet 7

INVENTORS
EDWIN O. MARTINSON
PHILIP A. HUFFAKER
BY
ATTORNEY

INVENTORS
EDWIN O. MARTINSON
PHILIP A. HUFFAKER
ATTORNEY

June 23, 1970  E. O. MARTINSON ET AL  3,516,462
APPARATUS FOR HARVESTING TREES
Filed May 4, 1967  21 Sheets-Sheet 9

INVENTORS
EDWIN O. MARTINSON
PHILIP A. HUFFAKER

BY *[signature]*
ATTORNEY

INVENTORS
EDWIN O. MARTINSON
PHILIP A. HUFFAKER

BY *W. [signature]*

ATTORNEY

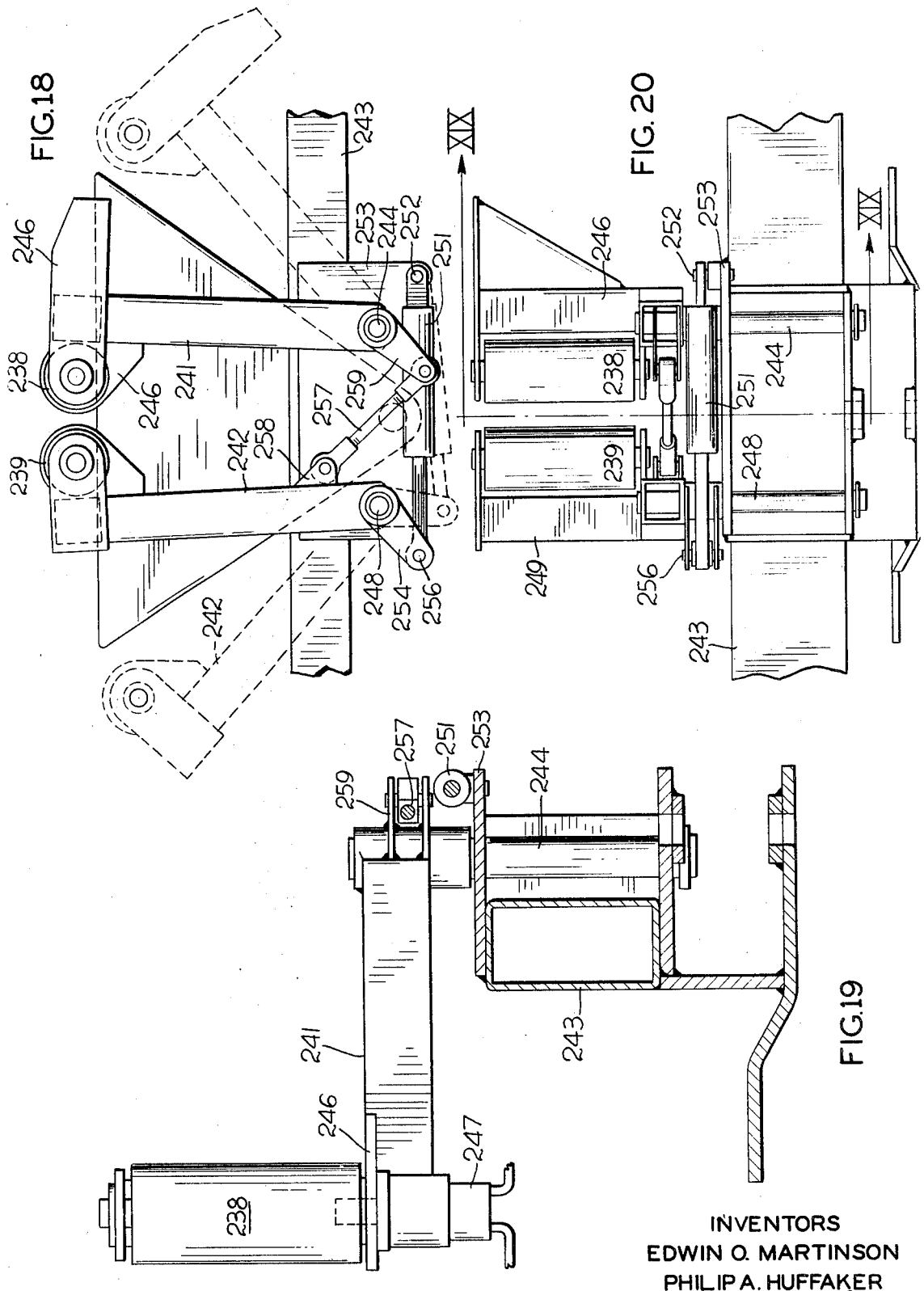

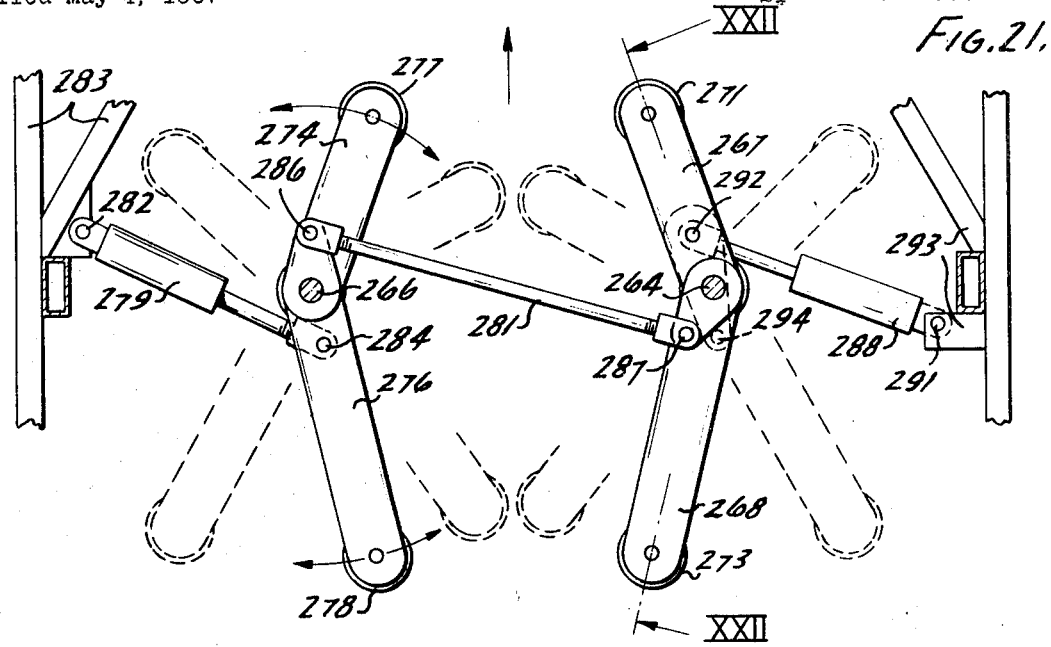
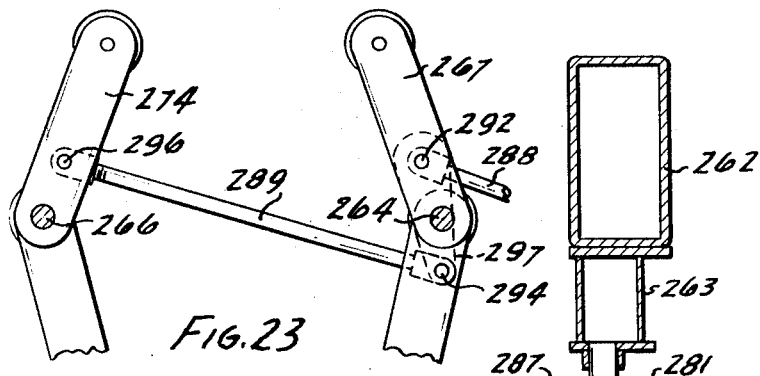
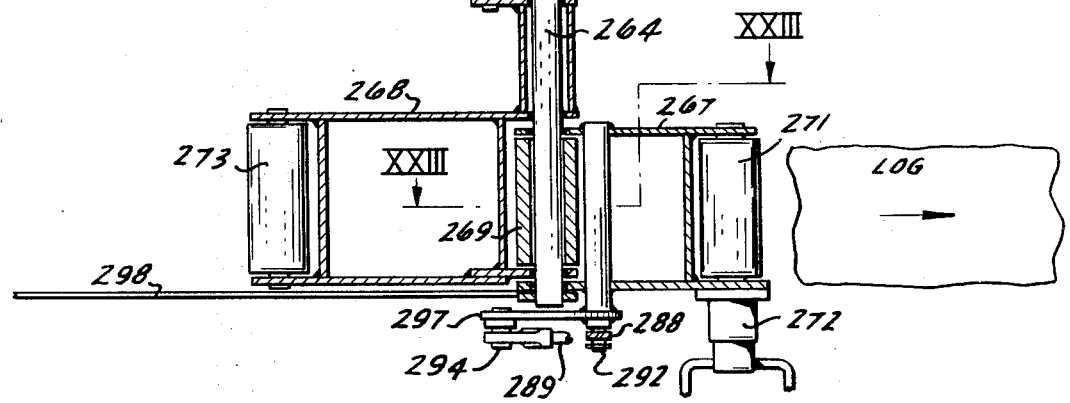
INVENTORS
EDWIN O. MARTINSON
PHILIP A. HUFFAKER INVENTORS
EDWIN O. MARTINSON
PHILIP A. HUFFAKER
BY [signature]
ATTORNEY June 23, 1970  E. O. MARTINSON ET AL  3,516,462
APPARATUS FOR HARVESTING TREES
Filed May 4, 1967  21 Sheets-Sheet 14

INVENTORS
EDWIN O. MARTINSON
PHILIP A. HUFFAKER
BY
ATTORNEY

June 23, 1970  E. O. MARTINSON ET AL  3,516,462
APPARATUS FOR HARVESTING TREES
Filed May 4, 1967  21 Sheets-Sheet 15

INVENTORS
EDWIN O. MARTINSON
PHILIP A. HUFFAKER
BY
ATTORNEY

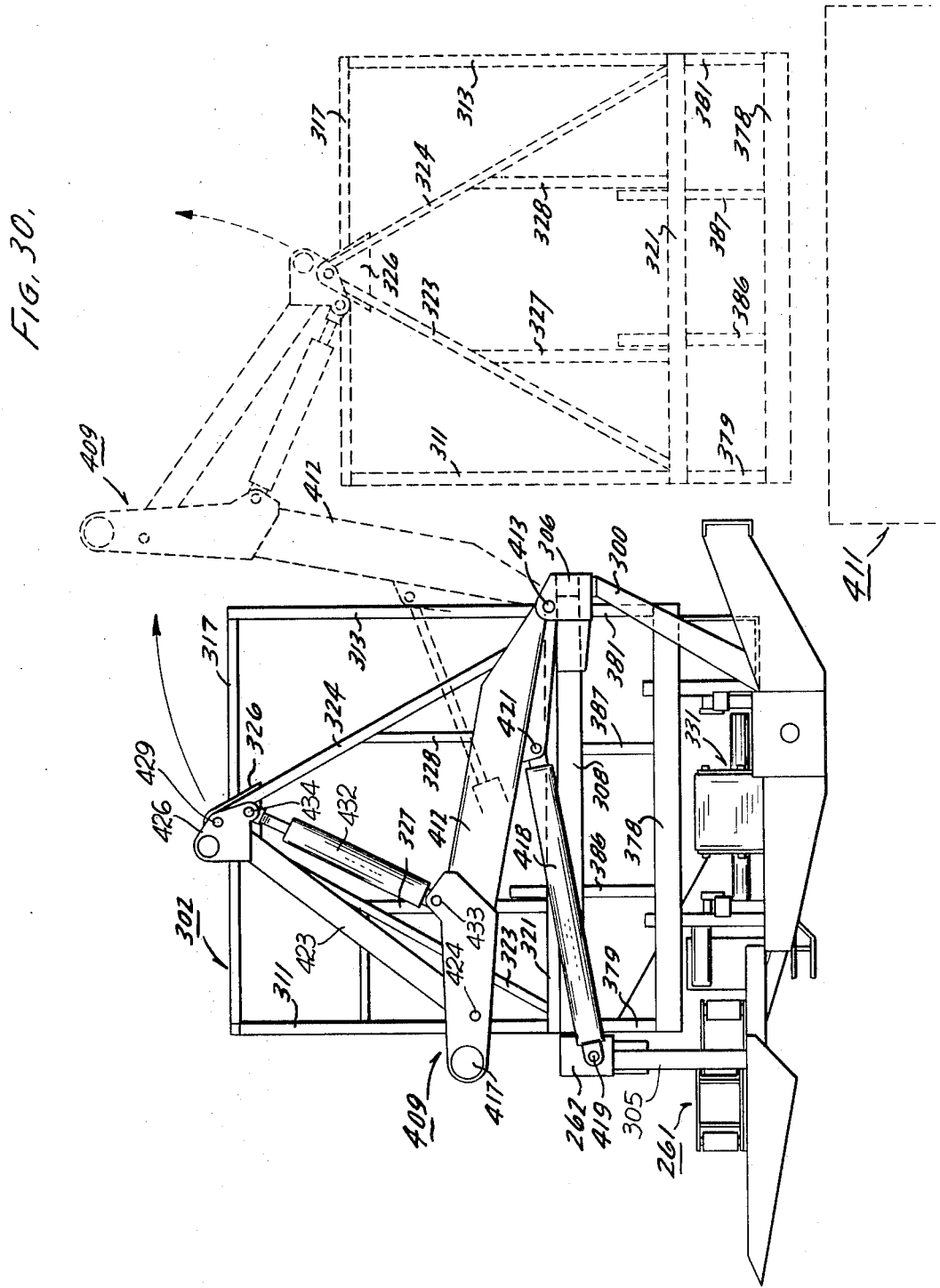

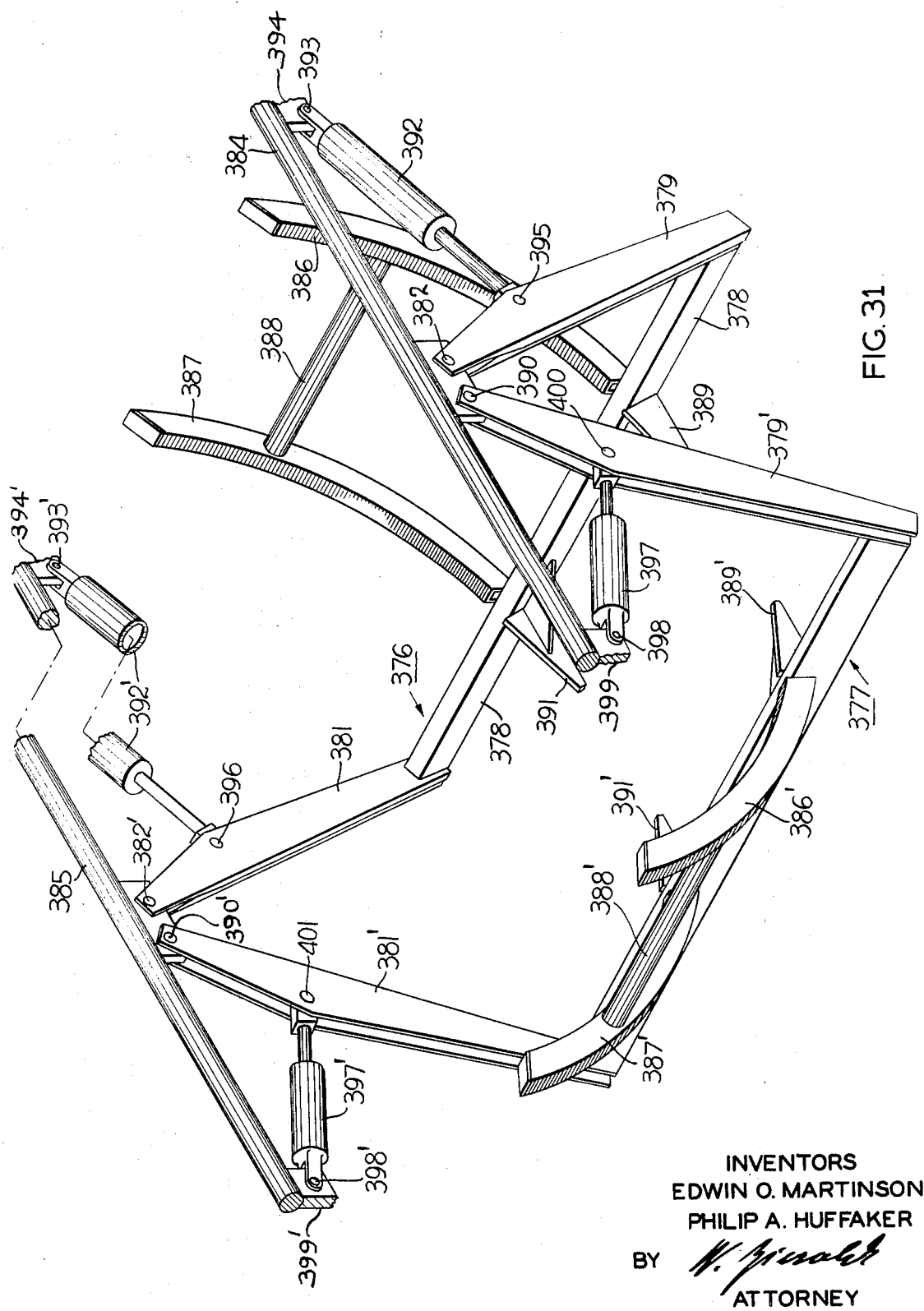

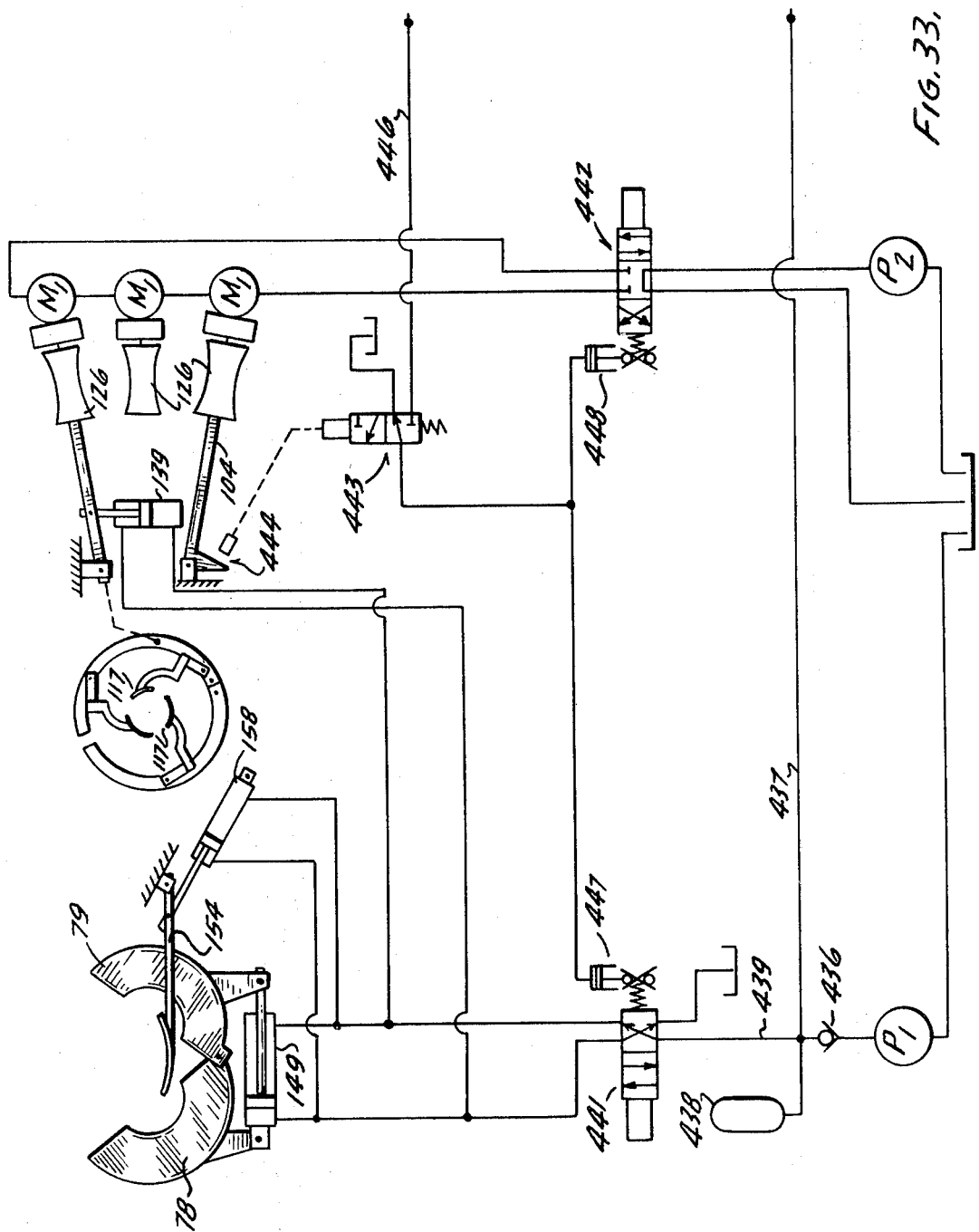

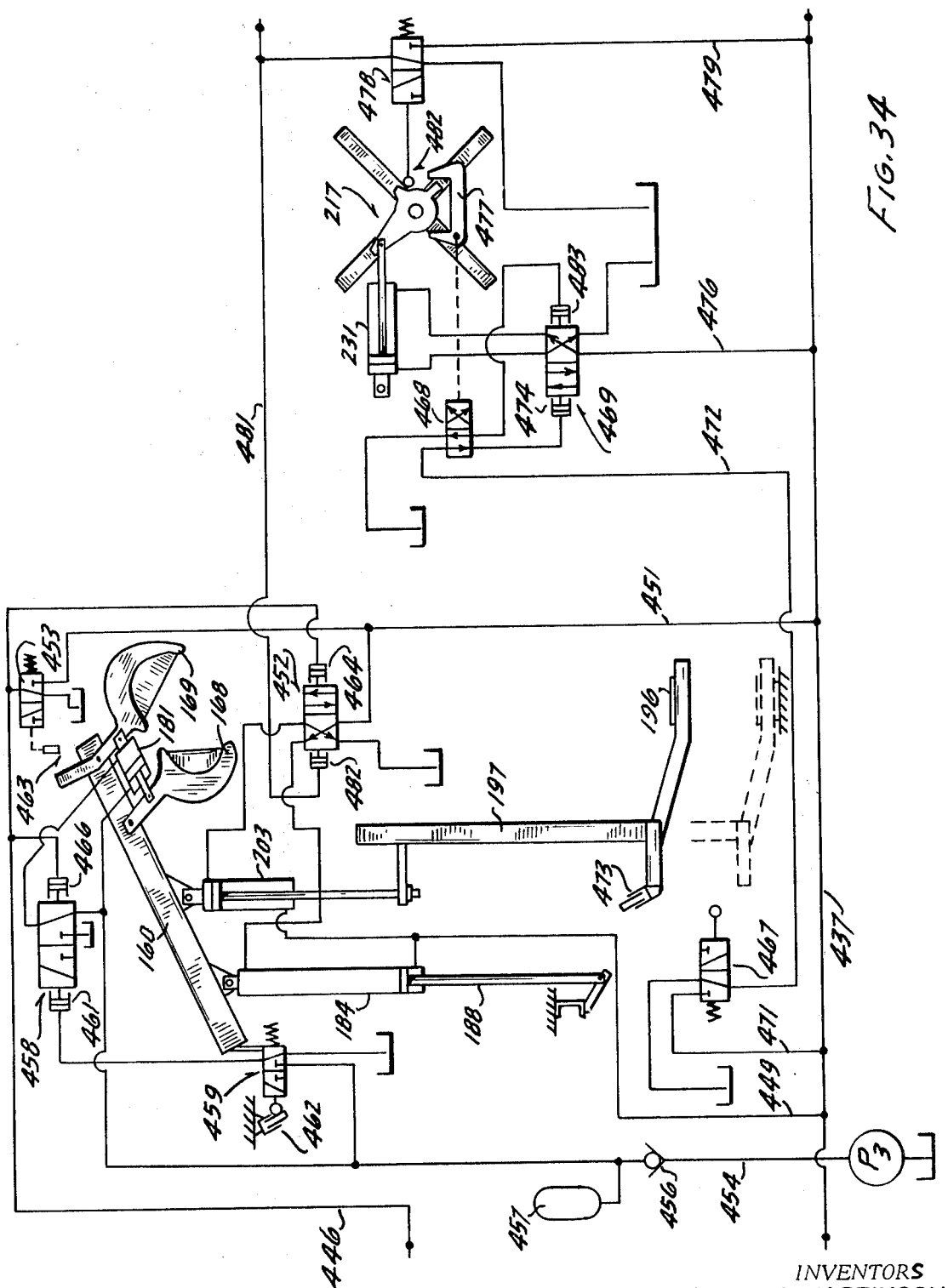

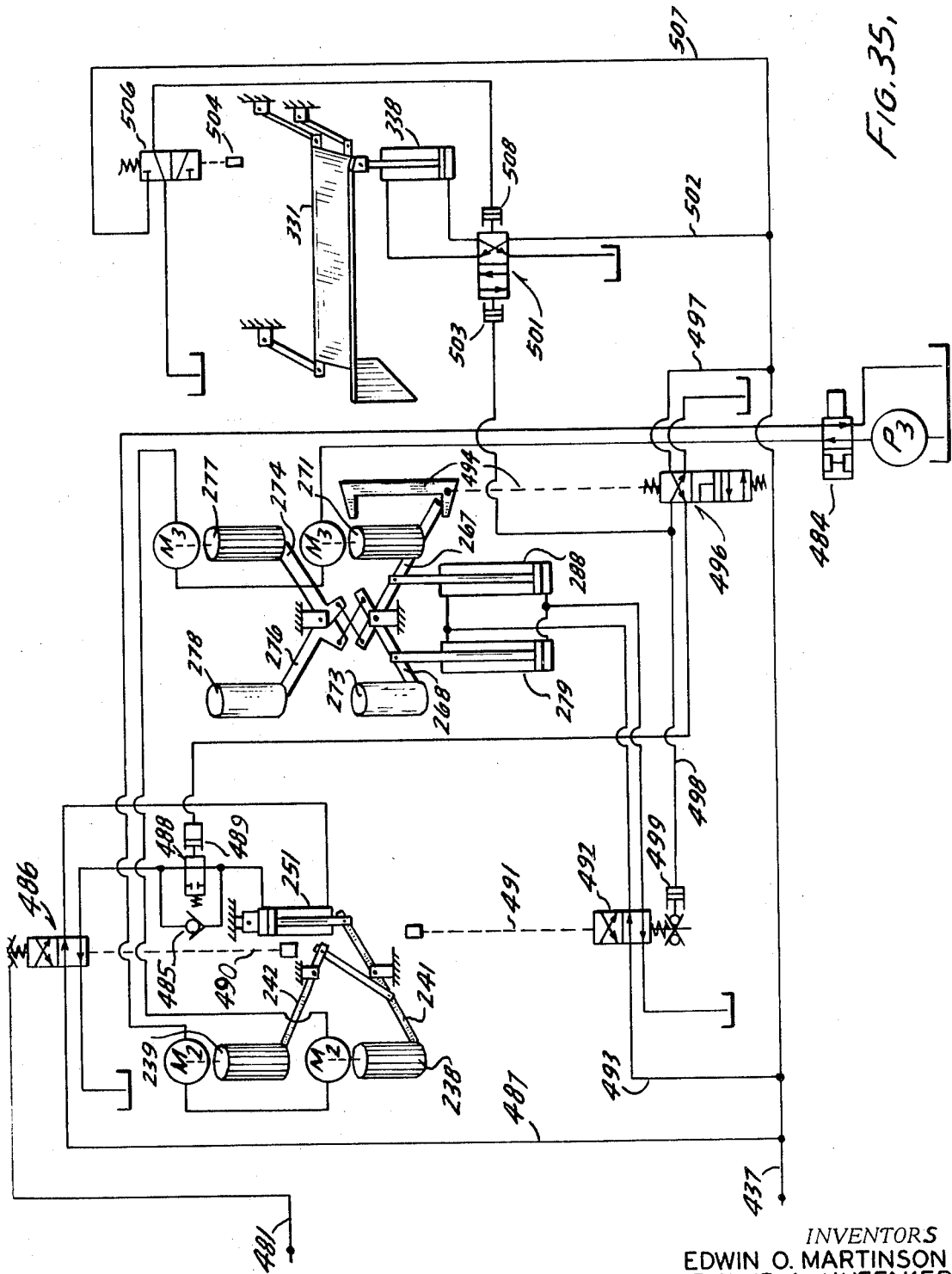

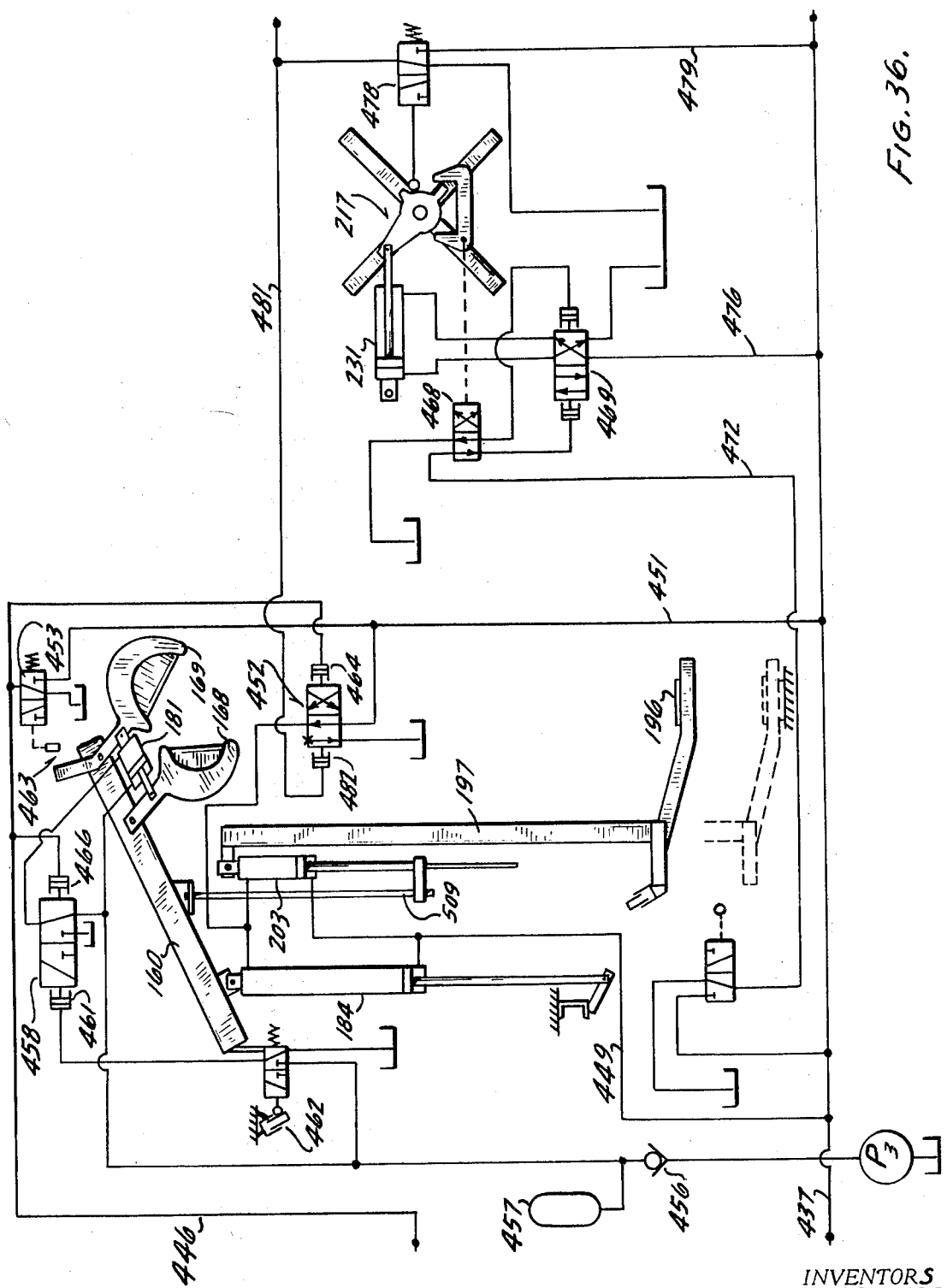

United States Patent Office 3,516,462
Patented June 23, 1970

3,516,462
APPARATUS FOR HARVESTING TREES
Edwin O. Martinson, Milwaukee, Wis., and Philip A. Huffaker, Brantford, Ontario, Canada, assignors to Koehring-Waterous, Ltd., Brantford, Ontario, Canada, a corporation of Canada
Filed May 4, 1967, Ser. No. 636,215
Claims priority, application Canada, Feb. 20, 1967, 983,325
Int. Cl. B27b 29/00
U.S. Cl. 144—3　　　　　　　　　　　　　　　7 Claims

ABSTRACT OF THE DISCLOSURE

A pulpwood tree is processed into logs by cutting the tree at its base while holding it against falling, lifting the upright tree into a delimbing head, lowering the upright tree through the delimbing head, successively severing upright logs from the delimbed trunk of the tree and turning the severed logs for horizontal stacking.

A mobile machine which performs the mentioned delimbing, log severing, log turning and log stacking operations without interrupting the steady lowering of the tree through the delimbing head.

---

The invention relates to the harvesting of trees, and it is concerned more particularly with the processing of pulpwood trees in the harvesting or stump area.

Generally, it is an object of the invention to provide an improved method of harvesting trees which will avoid the well known difficulties, inconveniences and hazards which are attendant to the conventional practice of felling a tree, that is, bringing it down into a lengthwise position on the ground, before proceeding with the delimbing, sectionalizing and log stacking operations.

With this general object in view the invention contemplates harvesting a selected tree by cutting it at its base while holding it against falling from its growth position; lifting the cut upright tree to an elevated position; progressively delimbing the tree from its butt end upward while continuously lowering it lengthwise from the elevated position; and successively severing vertical logs of pulpwood length from the delimbed continuously descending trunk of the tree.

More specifically, it is an object of the invention to provide an improved method of harvesting trees involving the mentioned tree holding, elevating, delimbing and log severing steps, and further steps of turning the delimbed log from the vertical position in which it is cut into a horizontal position, and transferring the horizontally positioned logs, without dropping them to the ground, successively into a hopper or the like.

A further object of the invention is to provide an improved tree harvesting method of the above outlined character wherein the lowering and delimbing of an individual tree continues without interruption while logs are cut, turned, transferred and stacked in the mobile hopper or the like. Another object of the invention is to provide an improved tree harvesting apparatus which will perform the above outlined method steps expeditiously and in a practical, fully satisfactory manner.

A more specific object of the invention is to provide an improved tree harvesting apparatus incorporating a folding boom and attached shear and tree gripping head, and a control mechanism which is readily operable to bring the shear and gripping head into cooperative engagement with a standing tree, to hold the tree upright while it is cut off at its base, to lift the cut tree to an upright elevated position, and to present the lifted tree in a position of accurate longitudinal alignment with an elevated delimbing head.

Another more specific object of the invention is to provide an improved wrap-around type delimbing head for use in a tree harvester of the mentioned character, the improved delimbing head incorporating feed rollers which, assisted by the weight of the tree, will lower the tree from its elevated position, and limb cutting knives which are automatically maintained in a predetermined radial relation to the trunk of the downwardly moving tree so that its branches will be cut off a short distance from their junctures with the trunk.

A further object of the invention is to provide an improved delimbing head of the mentioned character incorporating a mechanism for urging the feed rollers with progressively decreasing force into gripping engagement with the tree trunk as a diameter of the downwardly moving trunk decreases.

A further object of the invention is to provide an improved tree harvesting apparatus of the mentioned character incorporating a wrap-around type delimbing head and a mechanism which will automatically open the delimbing head and eject a tree or residual tree portion therefrom whose trunk diameter is of less than a preselected minimum size, say four inches.

A further object of the invention is to provide an improved log measuring and cutting mechanism for use in a tree harvester of the mentioned character, the improved mechanism being operative to sever a log of desired length from the trunk of the descending tree, and to lower the severed log away from the cutting mechanism at a controlled rate of speed; the purpose being to provide head clearance for turning the log from a vertical into a horizontal position, and also to avoid a sudden gravitational drop of the severed log before it is turned from its upright position below the delimbing head into a horizontal transfer position.

A further object of the invention is to provide an improved log turning mechanism for use in a tree harvesting apparatus of the mentioned character, the improved turning mechanism being automatically operative to alternately reverse the logs end for end as they emerge from the log measuring and cutting mechanism.

A further object of the invention is to provide a tree harvesting apparatus of the mentioned character incorporating a wheeled front unit on which the cut logs are turned from a vertical position into a horizontal position of lengthwise alignment with the front unit, a wheeled rear unit which has an articulated hitch connection with the front unit and to which the horizontally positioned logs may be transferred from the front unit, and a log straightening mechanism which will automatically align the transferred logs lengthwise with the rear units under conditions of angular displacements of one of the wheeled units relative to the other.

Another object of the invention is to provide a tree harvesting apparatus incorporating a log straightening device of the mentioned character and an improved mechanism for stacking the transferred logs on and unloading them from the rear unit, the improved log stacking and unloading mechanism including a hopper which has a bottom opening through which the transferred logs are crowded upwardly into the hopper and through which bottom opening the logs may be dropped after the loaded hopper has been swung to an overhanging unloading position on the rear unit.

These and other objects and advantages are attained by the present invention various novel features of which will become apparent from the description herein of a preferred embodiment of the invention and will be pointed out by the appended claims.

Referring to the accompanying drawings:

FIG. 4 is an enlarged side view of a tree hoisting boom and associated parts shown in FIG. 1;

FIG. 5 is a section on line V—V of FIG. 4;

FIG. 6 is an enlarged section on line VI—VI of FIG. 4;

FIG. 7 is a front view of a tree cutting and gripping head as seen from the left of FIG. 4 and taken in the direction of arrow A in FIG. 2;

FIG. 8 is a top view of FIG. 7;

FIG. 9 is a section on line IX—IX of FIG. 7;

FIG. 18 is a plan view of a log drive mechanism incorporated in the apparatus shown in FIG. 1;

FIG. 19 is a section on line XIX—XIX of FIG. 20;

FIG. 20 is an end elevation of the mechanism shown in FIG. 18, the view of FIG. 20 looking forwardly from the rear of the machine;

FIG. 21 is a plan view of a log straightening mechanism incorporated in the apparatus shown in FIG. 1;

FIG. 22 is a section on line XXII—XXII of FIG. 21;

FIG. 23 is a partial top view similar to FIG. 21 but taken generally on line XXIII—XXIII of FIG. 22;

FIG. 30 is a side elevation of the rear part of the machine illustrating the hopper in a log loading and unloading position;

FIG. 31 is a perspective view of a detail of the log hopper shown in FIG. 24.

FIGS. 33, 34 and 35 are diagrams of a hydraulic circuit for operating the apparatus shown in FIG. 1; and FIG. 36 is a circuit diagram similar to FIG. 34 but showing a modified flying shear arrangement.

Figure 1:
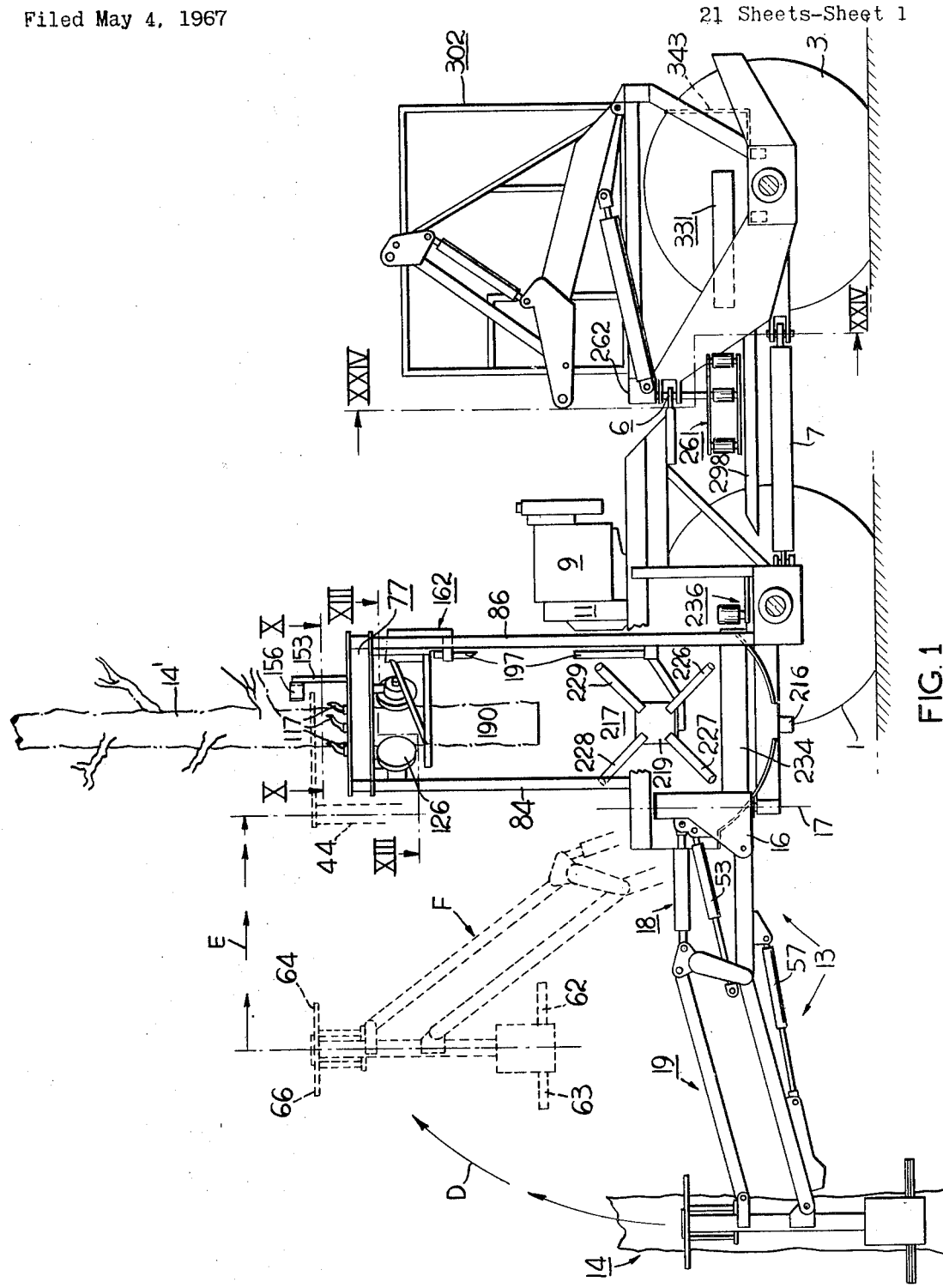
FIG. 1 is a somewhat schematic side view of a tree harvesting apparatus embodying the invention.
Figure 2:
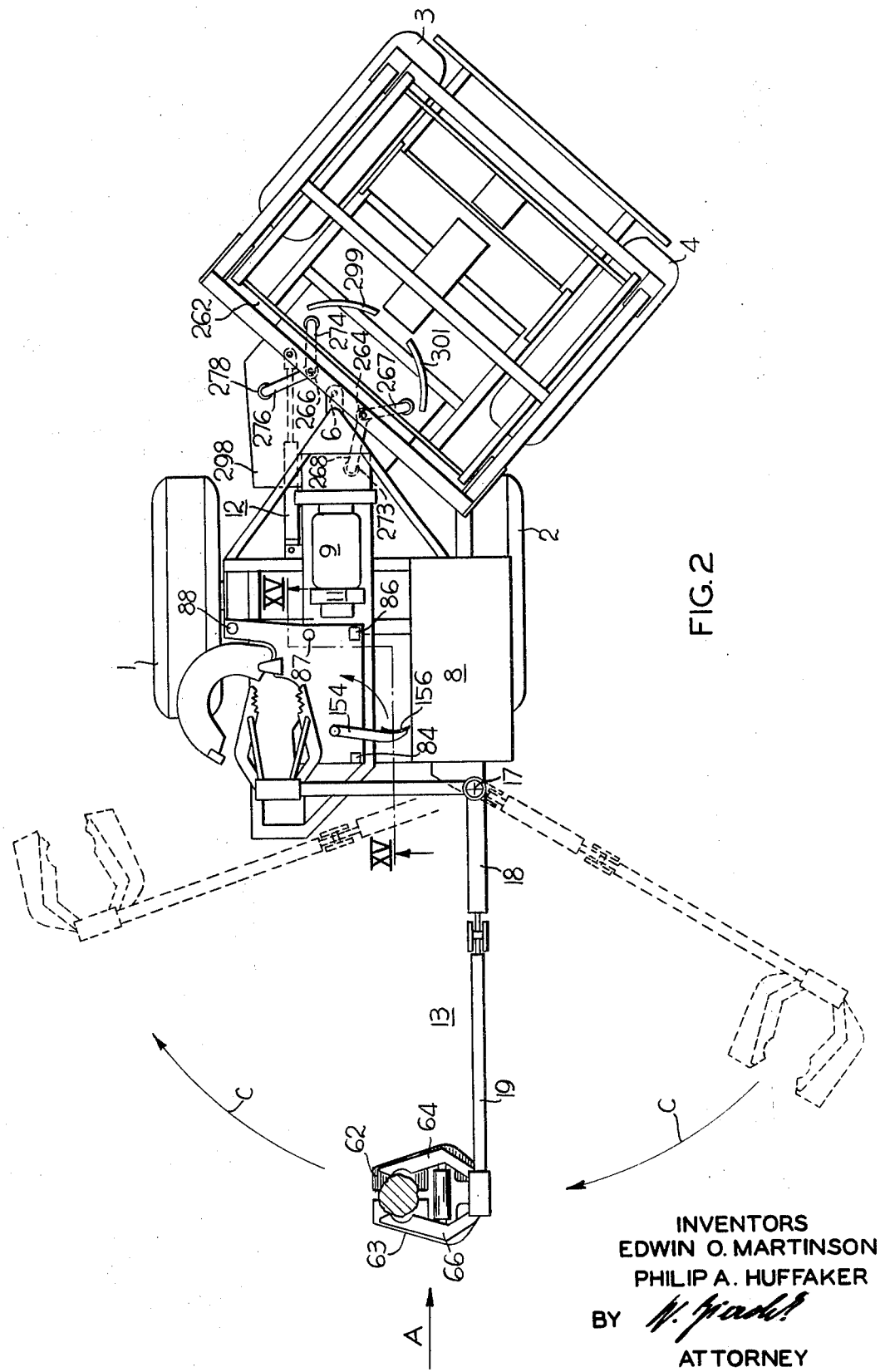
FIG. 2 is a top view of the apparatus shown in FIG. 1 and illustrating some of its components angularly displaced from the positions in which they are shown in FIG. 1.

Generally, the apparatus shown in FIGS. 1 and 2 constitutes an articulated, self-propelled vehicle comprising a front unit supported on right and left tired power driven wheels 1 and 2, and a rear unit supported on right and left, rubber tired power driven wheels 3 and 4. An upper swivel joint 6 and a lower drawbar 7 connect the frames of the front and rear units for relative pivotal and lateral rocking movement about the center of the swivel joint 6 and in vertically fixed relation to each other.

Figure 3:
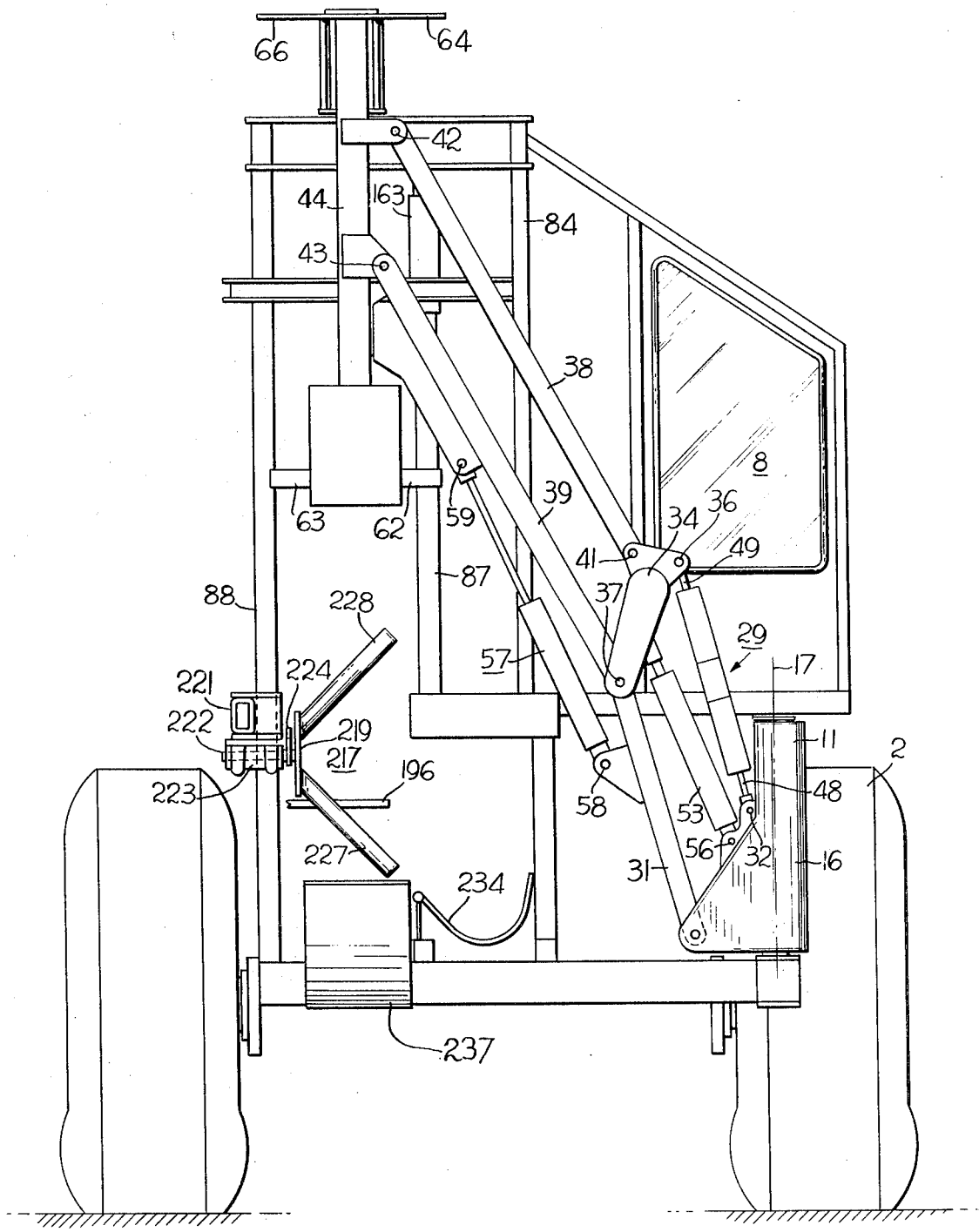
FIG. 3 is a front view, on an enlarged scale, of the apparatus shown in FIG. 1.

An operator's cab 8 is mounted on the frame of the front unit as generally indicated in FIGS. 2 and 3. Also mounted on the frame of the front unit as shown in FIGS. 1 and 2 is a power plant including an internal combustion engine 9, and a hydraulic pump unit 11, which is driven by the engine to supply pressure fluid to hydraulic drive motors, not shown, of the front and rear wheels, and to a number of hydraulic rams and motors for operating various mechanisms which will be described more fully hereinbelow.

Steering of the machine is accomplished by horizontal angling of the front and rear units relative to each other about the center of the swivel joint 6. For that purpose a double acting hydraulic ram 12 is operatively interposed between the front and rear units as shown in FIG. 2. Full expansion of the ram angles the rear unit to the position shown for a sharp left hand turn, and full contraction of the ram similarly angles the rear unit for a sharp right hand turn. For straight ahead travel the ram is adjusted to an intermediate position in which it places the front and rear units into longitudinal alinement with each other. A hydraulic circuit, not shown, for actuating the steering ram 12 includes a manually operable control valve in the operator's cab 8.

FIG. 1 shows a foldable tree hoisting boom 13 in a full line forwardly extended position to which it may be adjusted in order to reach a standing tree selected for harvesting and part of which is shown at 14.

TREE HOISTING BOOM

Generally, the hoisting boom 13 comprises a rotatable support 16 which is mounted on the chassis frame of the front unit for pivotal back and forth movement about a vertical axis 17; an inner boom arm 18 which is swingable up and down on the rotatable support 16, and an outer boom arm 19 which is swingable on the distal end of the inner boom arm 18.

Referring to FIGS. 4 and 5, a wide-angle swing mechanism for the tree hoisting boom 13 comprises a radius arm 21 fixed to the rotatable support 16, a traverse lever 22 pivoted at 23 on the front frame, a connecting link 24 between the distal ends of the radius arm 21 and traverse lever 22, and a double acting hydraulic swing cylinder 26 reacting between an anchor point 27 on the front frame and an intermediate point 28 of the traverse lever 22. A conventional hydraulic circuit, not shown, is connected with the swing cylinder 26 and includes a manually operable control valve in the operator's cab 8.

The inner boom arm 18 comprises an upper link 29 and a lower link 31 which are pivoted at vertically spaced centers 32 and 33, respectively, on the rotatable boom support 16; and a tie member 34 pivotally connected at spaced centers 36 and 37, respectively, with the distal ends of the upper and lower links 29 and 31, respectively, so as to form a quadrilateral linkage.

The outer boom arm comprises an upper link 38 and a lower link 39, the upper link 38 being pivoted at 41, and the lower link 39 being pivoted at 37 to the tie member 34. The outer ends of the upper and lower links 38, 39 of the outer boom arm are pivotally connected at vertically spaced centers 42 and 43, to a post 44 so as to form a parallelogram linkage.

The upper link 29 of the inner boom arm is extensible and contractable by means of two tandem connected double acting hydraulic extension rams 44 and 46. The cylinder portions of these rams are rigidly interconnected in axial alinement with each other by a tubular spacer 47. A reciprocable piston within the rearward extension ram 44 has an associated piston rod 48 which is pivoted at 32 to the rotatable boom support 16. Similarly, a reciprocable piston within the forward extension ram 46 has an associated piston rod 49 which is pivoted at 36 to the upper end of the tie member 34.

The rearward extension ram 44 has fluid ports, not shown, at its opposite ends, and a conventional hydraulic circuit, not shown, which is connected to these ports includes a manually operable control valve in the operator's cab 8. Similarly, the forward extension ram 46 has fluid ports, not shown, at its opposite ends, and a conventional hydraulic circuit, not shown, is connected to these ports and includes another manually operable control valve in the operator's cab 8. Selective manipulation of the control valves for the two extension rams 44, 46 permits contraction and expansion of either of these rams independently of the other.

In the condition of the parts as shown in FIG. 4 the inner extension ram 44 is fully extended, and the outer extension ram 46 is fully contracted. The upper link 29 of the inner boom arm is thereby adjusted to a length which places the post 44 of the outer boom arm into exact parallel relation with the vertical pivot axis 17 of the rotatable boom support 16. If the operator wants to tilt the post 44 of the outer boom arm into a rearwardly inclined position he may do so by manipulating the control valve for the rearward extension ram 44, and if he wants to tilt the post 44 into a forwardly inclined position he may do so by manipulation of the control valve for the forward extension ram 46. In either case, the operator may restore the post 44 of the outer boom arm to its precise center position, that is, to the position in which the post extends parallel to the vertical pivot axis 17 of the boom support 16, by fully extending the rearward or by fully contracting the forward extension cylinder, as the case may be.

The lower link 31 of the inner arm has a sleeve 51 (FIG. 6) around the pivot pin at 37, and an actuating arm 52 is secured to the sleeve 51 and extends radially from the pivot axis 37 on which the lower links 31, 39 of the inner and outer boom arms are connected with each other. A double acting lifting ram 53 extends between a pivot pin 54 on the actuating arm 52 and a pivot pin 56 on the rotatable boom support 16 in proximity to the pivot connection 32 between the latter and the upper link 29 of the inner boom arm. A conventional hydraulic circuit, not shown, is connected with the double acting lifting ram 53 and includes a manually operable control valve in the operator's cab 8.

A double acting bracing ram 57 extends between a pivot pin 58 on the lower link 31 of the inner boom arm and a pivot pin 59 on the lower link 39 of the outer boom arm. Extension and contraction of the bracing ram 57 adjusts the radial reach of the boom. A conventional hydraulic circuit, not shown, is connected with the bracing ram 57 and includes a manually operable control valve in the operator's cab 8.

TREE GRIPPING AND SHEAR HEAD

The upright post 44 of the outer boom arm extends upwardly beyond its pivotal connection 42 with the upper link 38, and downwardly beyond its pivotal connection 43 with the lower link 39 of the outer boom arm. As shown in FIGS. 7, 8 and 9, a length of square tubing which forms the post 44 presents parallel upright front and rear faces, and opposite side faces extending between the front and rear faces.

As shown in FIGS. 7 and 9, a pair of shear blade holders 62, 63 are swingably mounted at the lower end of the post 44; and as shown in FIGS. 7 and 8, a pair of tree gripping arms 64, 66 are swingably mounted at the upper end of the post and above the shear blade holders. Vertically spaced bearings 67, 68 (FIG. 7) mounting a pivot pin 69 for the blade holder 63 are alined at one side of the tubing 44, and similar vertically spaced bearings mounting a pivot pin 71 for the blade holder 62 are alined at the opposite side of the tubing 44. The blade holders 62, 63 are swingable toward and away from each other at the side of the tubing 44 which is the leading side when the boom is swung in clockwise direction, as indicated by arrows C in FIG. 2, about its vertical pivot axis 17 on the front unit. The blade holders 62, 63 are provided at their free ends with complementary tree cutting blades, 70 and 75, respectively, and a double acting hydraulic cutting ram 72 is pivotally connected at its opposite ends with the blade holders for swinging them back and forth between shear open and shear closed positions. The cutting ram 72 is connected with a conventional hydraulic circuit, not shown, which includes a manually operable control valve in the operator's cab 8. A ground engaging runner 60 and a guard plate 61 are secured to the lower and upper ends, respectively, of the post 44.

The tree gripping arms 64, 66 are similarly mounted on the post 44 for swinging movement toward and away from each other at the side of the square tubing which is the leading side when the boom is swung clockwise about its vertical pivot axis 17 on the front unit. Pivot pins 73 and 74 for the tree gripping arms 64, 66, respectively, are mounted in vertically spaced bearings at opposite sides, respectively, of the post 44. A double acting hydraulic ram 76 is pivotally connected at its opposite ends with the gripping arms 64, 66 for swinging them back and forth between tree gripping and tree releasing positions. The gripping ram 76 is connected with a conventional hydraulic circuit, not shown, which includes a manually operable control valve in the operator's cab 8.

FIG. 2 shows the tree hoisting boom 13 and the associated tree gripping and shear head in four different positions of adjustment, namely, a forwardly extended position shown in full lines which corresponds to the full line position in which the boom and head are shown in FIG. 1; two dotted line extended positions, one slued to the right and the other slued to the left of the full line position; and a third full line position in which the boom is retracted and extends in a vertical plane at right angles to the longitudinal axis of the front unit. The forwardly extended full line position and the extended right and left slued positions of the boom illustrate the radial reach within which a tree which has been selected for harvesting, may be grappled by the gripping and shear head. The retracted, right angle position of the boom in FIG. 2 corresponds to the raised position in which the boom and tree gripping and shear head are shown in FIG. 3.

After the cutting ram 72 and the gripping ram 76 have been energized to adjust the shear blades 72, 73 and the tree gripping arms 64, 66 to wide open positions, the hoisting boom may be manipulated by operation of the swing cylinder 26, the lifting ram 53, the bracing ram 57, and if necessary, by operation of one or the other of the extension rams 44, 46, so as to straddle a selected tree at its base by the open shear blades and at the same time at some higher level by the open gripping arms 64, 66. The gripping ram 76 may then be energized to tightly grip the selected tree, and the cutting ram 72 may be energized to bring the shear blades together and thereby cut off the trunk of the tree at its base while the tree is held against falling from its growth position by the closed gripping arms 64, 66.

The arrows D and E in FIG. 1 indicate the directions in which the cut tree may be raised from its growth position at 14 to an elevated position at 14' over the forward vehicle unit and into a delimbing head generally designated by the reference character 77.

If the post 44 has been tilted by adjustment of one or the other of the extension rams 44, 46 to facilitate grappling of the selected tree, the adjusted ram will be restored to its normal position after the tree has been cut, and the post 44 together with the grappled tree will then extend accurately parallel with the vertical pivot axis 17 of the boom.

DELIMBING HEAD

Referring to FIGS. 1 and 2, upstanding posts 84, 86 and 88 on the chassis frame of the front vehicle unit form a tower structure, and a clamp structure 77 comprising complementary jaw members in the form of housing sections 78, 79 (FIG. 10) are mounted at the upper end of the tower structure.

Figure 10:
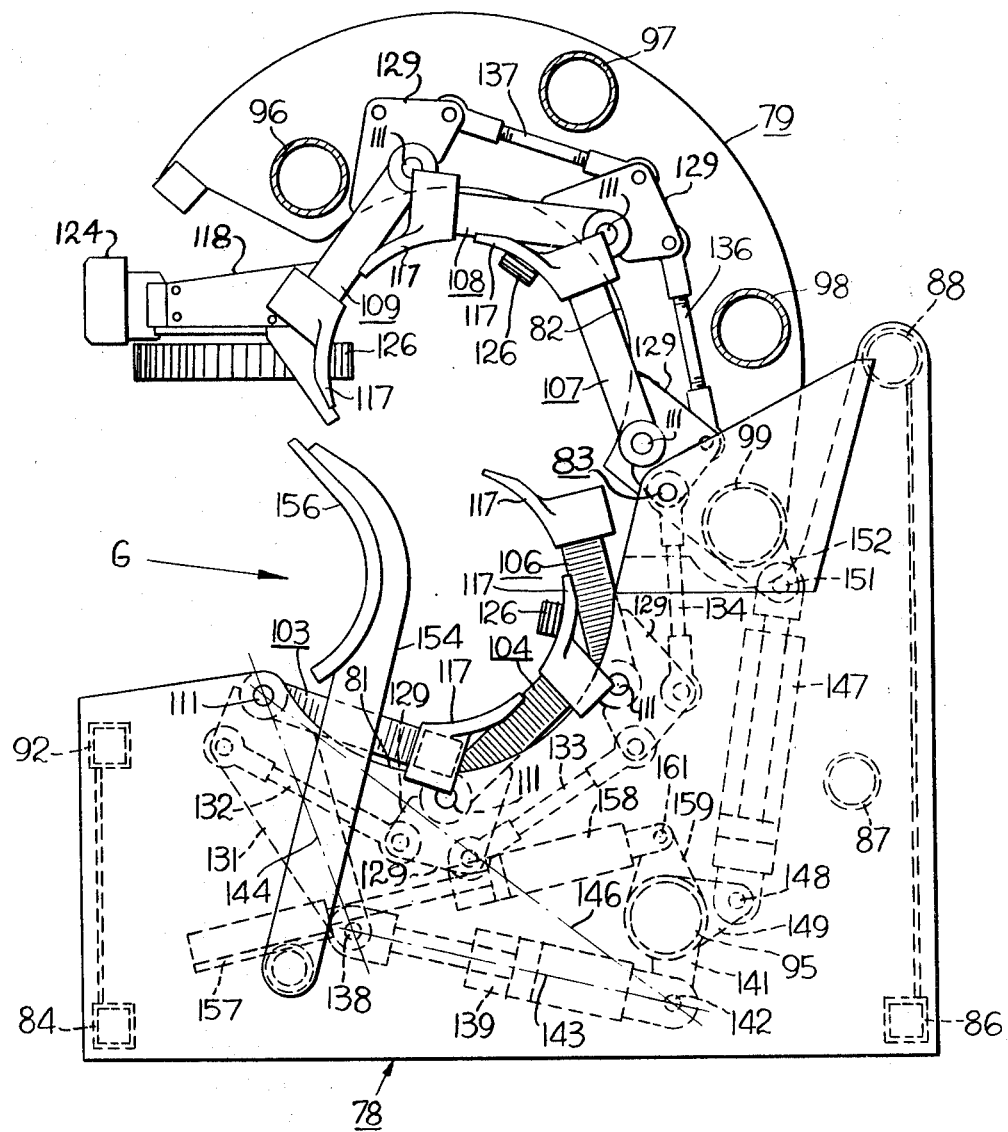
FIG. 10 is a top view of a tree feeding and delimbing head, the view being taken on line X—X of FIG. 1 and showing the head in an open tree accepting position.
Figure 11:
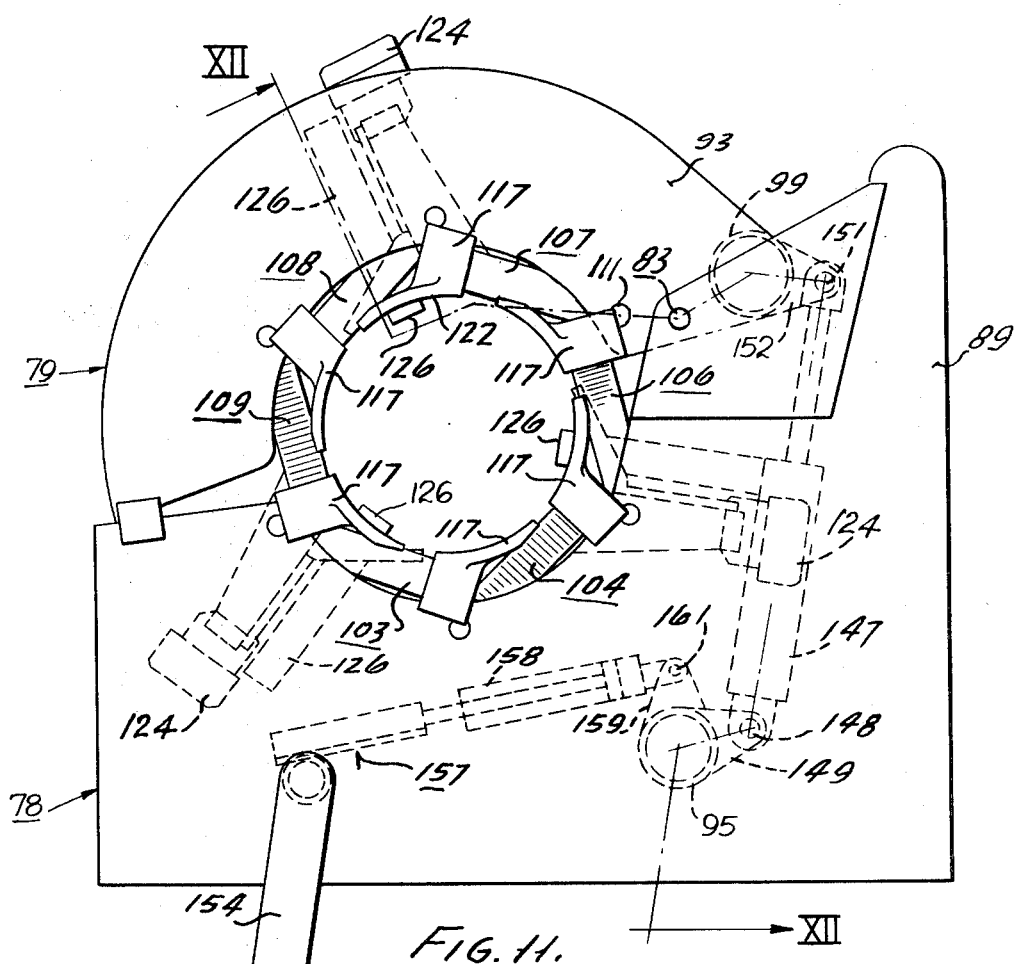
FIG. 11 is a view similar to FIG. 10, but showing the head in a closed tree encircling position.

The housing section 78 presents a generally semi-circular recess 81 at one side and is mounted in a fixed, elevated, horizontal position on the upper ends of the posts 84, 86 and 88. The housing section 79 presents a complementary semi-circular recess 82 and has a pivot connection 83 on a vertical axis with the fixed housing section 78. As shown in FIGS. 10 and 11, the complementary housing section 78, 79 are movable into a diverging, tree accepting position (FIG. 10) and into a converging tree encircling position (FIG. 11) within a predetermined working range above the chassis frame of the front vehicle unit. Tree feeding and delimbing means are operatively associated with the clamp structure 77, as will be explained more fully hereinbelow.

Top and bottom plates 89, 91 (FIG. 12) of the fixed housing section 78 are rigidly spaced apart by the upper ends of the posts 84, 86, 87, 88 and by a square spacer 92 and a circular spacer 95 (FIG. 10). The swingable housing section 79 comprises top and bottom plates 93, 94 (FIG. 12) which are rigidly spaced apart by tubular spacers 96, 97, 98 and 99 the same distance as the top and bottom plates 89, 91 of the fixed housing section 78. The pivot connection 83 between the housing sections 78, 79 comprises an upper pivot pin 110 (FIG. 12) which extends through overlapping portions of the top plates 89, 93 of the fixed and swingable housing sections, and a lower pivot pin 102 which extends through overlapping portions of the bottom plates 91, 94 of the housing sections.

Pivotally mounted between the top and bottom plates of the fixed housing section 78 are three knife supports 103, 104 and 106; and similarly mounted between the top and bottom plates of the swingable housing section 79 are three knife supports 107, 108 and 109.

Figure 12:
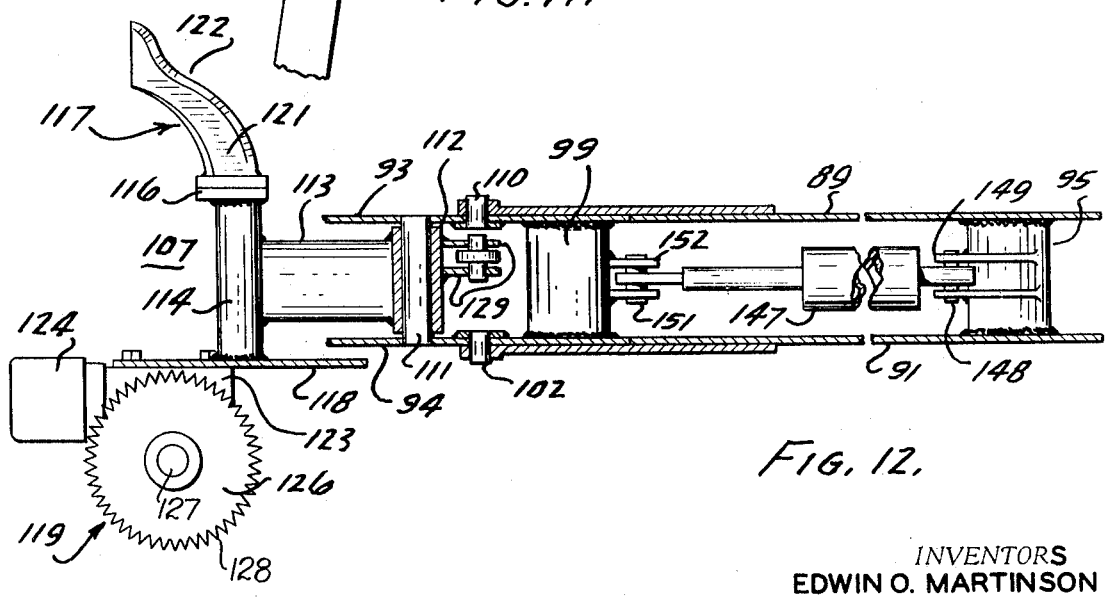
FIG. 12 is a section generally on line XII—XII of FIG. 11.

FIG. 12 shows the construction and mounting of the swingable knife support 107. A fixed vertical pivot pin 111 is surrounded by a hub sleeve 112 of the knife support, and rigidly secured to the hub sleeve is a radius arm 113 which carries a vertical post 114 at its outer end. The post 114 projects upwardly beyond the top plate 93 and downwardly below the bottom plate 94 of the swingable housing section at the arcuately recessed side of the latter. A horizontal mounting plate 116 for a delimbing knife 117 is secured to the upper end of the post, and a horizontal mounting plate 118 for a feed roll assembly 119 is secured to the lower end of the post 114.

The delimbing knife 117 comprises a spirally curved blade portion 121 which is secured to the mounting plate 116 in an upstanding position. A spiral cutting edge 122 is formed along the radially inner, circularly curved side of the blade.

The feed roll assembly 119 comprises a worm gear unit 123 which is bolted in a depending position to the under side of the lower mounting plate 118. Mounted on the housing of the worm gear unit is a hydraulic motor 124 for driving a feed roll 126 on the output shaft 127 of the worm gear unit. The feed roll has a circumferential series of sharp gripping teeth 128 on a pitch diameter of such size that in the assembled condition of the parts the gripping teeth project a short distance beyond the delimbing knife 117 at the radially inner side of the latter.

Also secured to the hub sleeve 112 of the knife support 107 as shown in FIG. 12 are two vertically spaced plates forming a rocker arm 129 between the top and bottom plates of the swingable housing section 79.

The foregoing explanation with respect to the knife support 107 analogously apply to the knife support 109 on the swingable housing section, and also to the knife support 104 on the fixed housing section. The knife supports 104 and 109 like the knife support 107, mount a delimbing knife 117 and a feed roll 126 projecting radially inward beyond the cutting edge 122 of the associated delimbing knife.

The knife supports 103, 106 and 108 are similar to the knife support 107 in that they each include a hub sleeve 112, a radius arm 113, an end post 114 and a rocker arm 129 corresponding to the hub sleeve, radius arm, end post and rocker arm of the knife support 107. A delimbing knife 117, like the delimbing knife on the knife support 107, is mounted on the end post 114 of each of the knife supports 103, 106 and 108. However, no feed rolls and associated drive mechanisms are mounted on the supports 103, 106 and 108.

An actuating arm 131 is secured to the hub sleeve 112 of the knife support 103 and extends radially therefrom within the space between the top and bottom plates 89, 91 of the fixed housing section 78.

A first connecting link 132 of adjustable length extends between the actuating arm 131 and the rocker arm 129 of the knife support 104. Similar connecting links 133, 134, 136 and 137 extend between the rocker arms 129 of relatively adjacent knife supports.

The actuating arm 131 of the knife support 103 is connected at its swinging end by a pivot pin 138 with the piston rod of a double acting ram 139 which is swingably connected at its barrel end with an arm 141 of the spacer 95 by means of a vertical pivot pin 142 between the top and bottom plates of the fixed housing section 78. In the fully extended condition of the ram 139, as shown in FIG. 10, the center line 143 of the latter and the center line 144 of the actuating arm 131 intersect each other at a point which is spaced a substantial transverse distance from the connecting line 146 between the axis of the pivot pin 111 of the knife support 103 and the axis of the ram pivot pin 142. The actuating arm and ram thus constitutes a toggle linkage which exerts a steadily decreasing torque upon the knife support 103 as the ram 139 contracts under a constant fluid pressure admitted to rod side of its piston. The torque transmitted through the links 132, 133, 134, 136 and 137 to the knife supports 104, 106, 107, 108 and 109 by contraction of the ram 139 further diminishes due to decreasing leverage as the knife and feed roller supports 104, 107 and 109 swing anti-clockwise as viewed in FIG. 10 about their respective pivot centers. Accordingly, the feed rollers 126 will be urged against the trunk of an encircled tree with a force which decreases progessively as the diameter of the trunk decreases, while the contracting force of the ram 139 remains constant. That means that trunks of relatively small diameter are not apt to be crushed by excessive pressure of the feed rollers, and that the grip of the feed rollers upon trunks of relatively large diameter will be very firm without change of the fluid pressure at the rod side of the piston of ram 139.

Another double acting hydraulic ram 147 is mounted between the top and bottom plates of the fixed housing section 78 so as to react between the latter and a portion of the swingable housing section 79 at a radial distance from the vertical pivot axis 83 on which the fixed and swingable housing sections are connected together. The barrel end of the ram 147 is connected by a pivot pin 148 to an arm 149 on the spacer 95, and the piston rod of the ram 147 is connected by a pivot pin 151 to an arm 152 on the spacer 99. Contraction of the the ram 147 places the delimbing head into its open tree accepting position in which it is shown in FIG. 10, and expansion of the ram places the delimbing head into its closed tree encircling position in which it is shown in FIG. 11.

TREE EJECTING MECHANISM

In addition to the six delimbing knives 117 and the three feed rollers 126, the delimbing head 77 mounts a mechanism for ejecting a tree or tree portion which has a trunk diameter of less than a certain minimum size, say four inches.

Generally, the tree ejecting mechanism comprises an upright shaft 153 (FIG. 1) which is rotatably mounted on the fixed housing section 78 and extends upwardly therefrom beyond the knives 117. Rigidly secured to the upper end of the shaft 153 is a radial arm 154 (FIG. 2) which has a cupped vertical end plate 156 at such a distance from the shaft axis that it will sweep a tree or tree portion out of the open delimbing head 77 upon anticlockwise rotation of the shaft as viewed in FIG. 2.

Back and forth movement of the ejector arm 154 between the tree ejecting position in which it is shown in FIG. 10 and the tree clearing position in which is shown in FIG. 11 is effected by a double acting hydraulic ram 158 and an associated rack and pinion drive 157 (FIG. 10). The barrel of the ram 158 is connected to an arm 159 of the spacer 95 by a vertical pivot pin 161, and the piston rod of the ram is alined with the rack bar of the rack and pinion drive 157. An expansion stroke of the ram 158 swings the ejector arm 154 from the tree clearing position shown in FIG. 11 into the tree ejecting position shown in FIG. 10.

Return movement of the ejector arm 154 from its FIG. 10 position to its FIG. 11 position is initially effected sidewise entry of a tree trunk into the open delimbing head and then by a contraction stroke of the ram 158 as will be explained more fully hereinbelow.

DELIMBING OPERATION

While the butt end of a cut tree rests on the closed tree cutting blades 70, 75 of the tree gripping and shear head (FIG. 9), and the tree is held upright by the closed gripping arms 64, 66, the tree hoisting boom may be raised to the dotted line position shown at F in FIG. 1. Such raising of the boom brings the tree cutting blade holders 62, 63 to a level below the delimbing head 77, and the tree gripping arms 64, 66 to a level above the cutting knives 117 of the delimbing head.

The arrow G in FIG. 10 indicates the direction in which a tree sustained by the closed tree cutting blades and tree gripping arms of the raised boom may be moved sidewise into the open delimbing head. Such sidewise movement may be effected by an expansion stroke of the boom swing cylinder 26 (FIG. 5) while the boom is maintained in the raised position shown at F in FIG. 1.

Sidewise advance movement of a raised tree in the direction of arrow G in FIG. 10 first urges the ejector arm 154 in clockwise direction from the ejecting position in which it is shown in FIG. 10. Fluid pressure in the barrel end of ram 158 may oppose such clockwise movement of the ejector arm, as will be explained more fully hereinbelow. However, the torque exerted upon the boom 13 by the expansion of the swing cylinder 26 will nevertheless be sufficient to force the ejector arm in clockwise direction from its FIG. 10 position.

When the tree has arrived at the center of the arcuate recess 81 of the delimbing head, the head may be closed by an expansion stroke of the ram 147. The cutting blades and gripping arms of the tree gripping and shear head on the boom 13 may then be opened, and the swing cylinder 26 may be actuated to disengage the tree gripping and shear head from the tree which is encircled by the closed delimbing head 77.

While pressure fluid is admitted to the barrel end of the ram 147 in order to close the delimbing head 77, pressure fluid may also be admitted to the gland end of the ejector cylinder 158 in order to swing the ejector arm 154 away from the tree and into the tree clearing position in which it is shown in FIG. 11.

The knife and feed roller actuating ram 139 of the delimbing head will be in its fully expanded condition while the tree moves into the open delimbing head, and the ram 139 will remain in that condition until the delimbing head is closed by an expansion stroke of the ram 147. At that time, the knife actuating cylinder 139 may be energized so that it will contract and bring the feed rollers 119 into radial contact with the trunk portion of the encircled tree which projects from the under side of the delimbing head 77. The cutting edges 122 of the knives 117 will remain spaced a short radial distance, say a quarter of an inch, from the periphery of the tree trunk when the feed rollers 119 are firmly engaged with the trunk, due to the mentioned radial offsetting of the knives with respect to the feed rollers.

During the closing of the delimbing head, the drive motors 124 for the feed rollers 119 may be de-energized, but after the delimbing head has been closed and the drive rollers have been forced into engagement with the encircled tree, fluid pressure may be admitted to the motors 124 so that they will rotate the feed rollers in a direction to pull the tree downward from its elevated position above the chassis of the forward vehicle unit. As a result, the tree will be progressively delimbed from its butt end upward while it is lowered lengthwise from the elevated position. The branches of the descending tree which move against the helical cutting edges 122 of the stationary knives 117 will be readily severed from the trunk because their thickness at the point of cut is not as great as at their immediate juncture with the trunk.

As the tree is lowered from its elevated position, the delimbed trunk of the tree emerges from the under side of the delimbing head 77. Logs of pulpwood length, normally eight feet, are cut from the delimbed trunk by means of a flying shear mechanism which is generally designated in FIG. 1 by the reference numeral 162 and which is mounted on the forward vehicle unit for up and down movement below the delimbing head 77.

FLYING SHEAR MECHANISM

Figure 13:
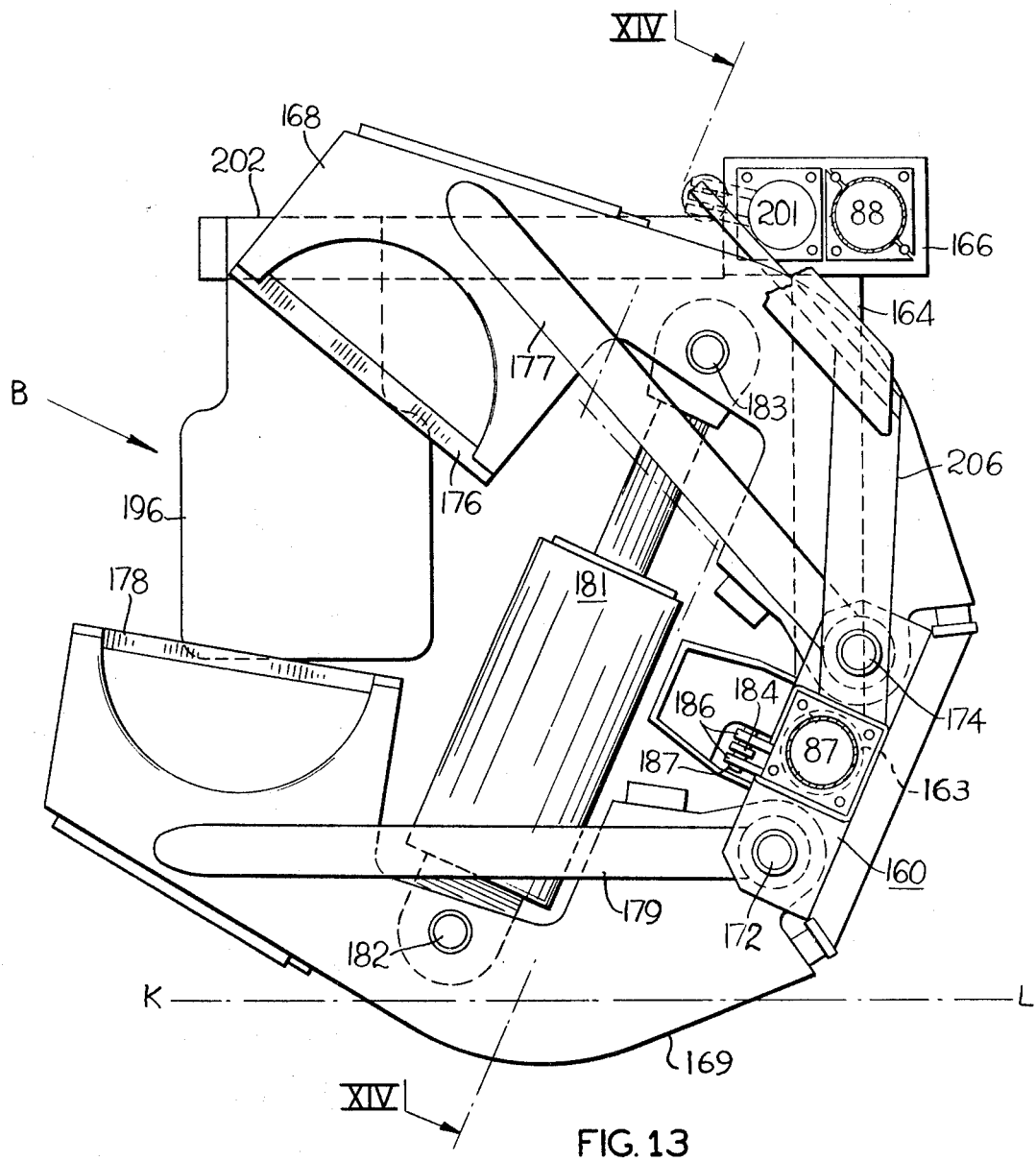
FIG. 13 is a top view of a flying shear mechanism, the view being taken generally on line XIII—XIII of FIG. 1.
Figure 14:
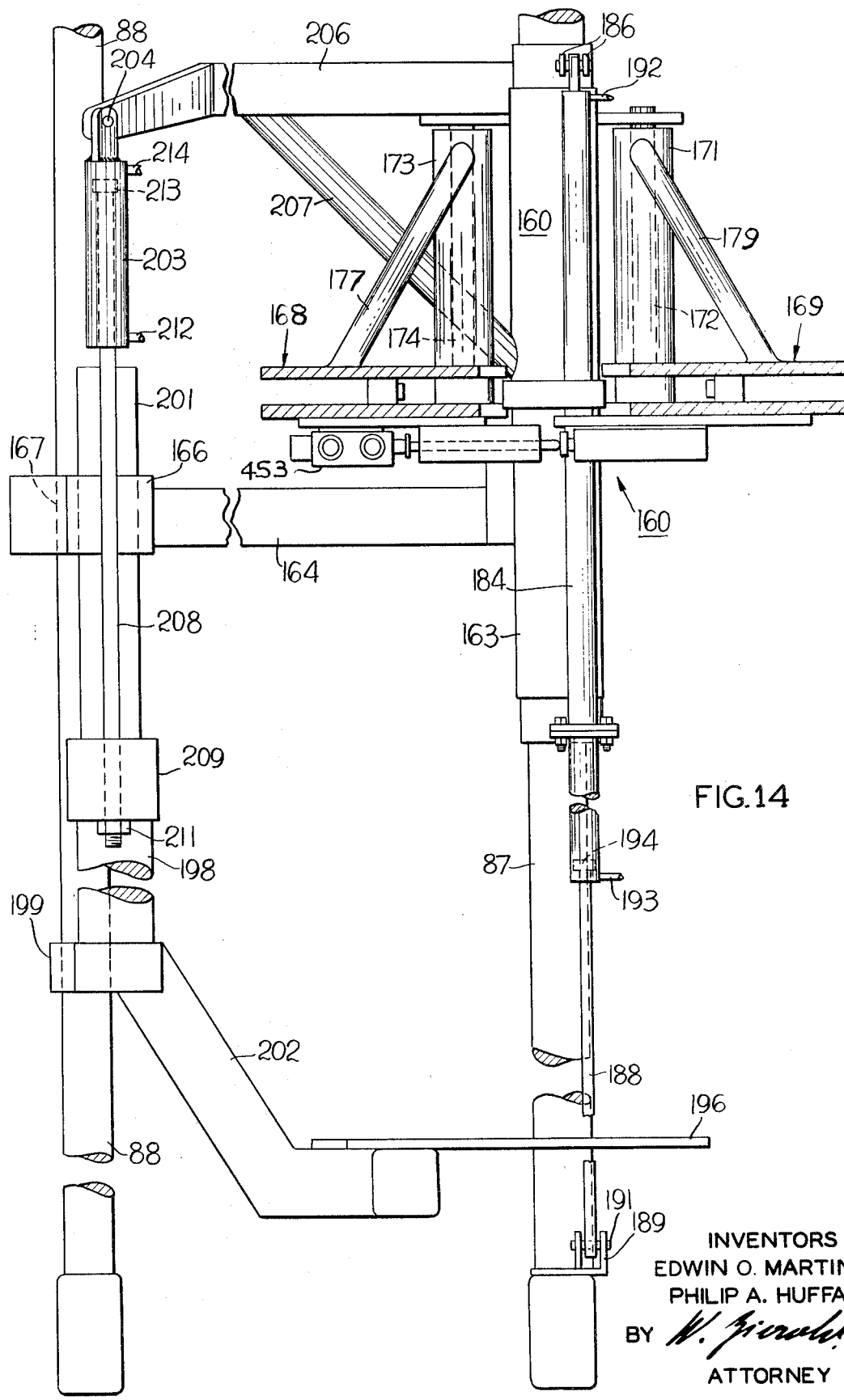
FIG. 14 is an oblique front elevation of the flying shear shown in FIG. 13, the view of FIG. 14 being taken in the direction of arrow B in FIG. 13, parts being broken away and shown in section on line XIV—XIV of FIG. 13.

The flying shear mechanism as shown in FIGS. 13 and 14, comprises a frame 160 including a cylindrical frame tube 163 which is guided for up and down movement on the cylindrical frame post 87 (FIG. 2) of the forward vehicle unit. Rigidly secured to the frame tube 163 intermediate its upper and lower ends is a horizontal side arm 164 which has a guide block 166 at its outer end. A vertical bore 167 of the guide block 166 has a sliding fit on the cylindrical frame post 88 (FIG. 2) of the forward vehicle unit, and the frame tube 163 is thus secured against rotation about the axis of the cylindrical frame post 87.

Swingably mounted on the frame tube 163 are two blade holders 168 and 169, the blade holder 169 having a hub 171 journaled on a vertical pivot pin 172 at one side of the tube 163, and the blade holder 168 having a hub 173 journaled on a vertical pivot pin 174 at the side of the frame tube 163 diametrically opposite to the pivot pin 172. The blade holder 168 mounts a horizontal shear blade 176 (FIG. 13) and is reinforced by a diagonal brace 177, and the blade holder 169 similarly mounts a horizontal shear blade 178 and is reinforced by a diagonal brace 179.

Referring to FIG. 13, a double acting ram 181 for swinging the blade holders 168, 169 towards and away from each other about their respective pivot pins 174, 172 is mounted between the blade holders in the space between the frame tube 163 and the blades 176, 178. The barrel of the blade actuating ram 181 is connected to the blade holder 169 by a vertical pivot pin 182, and the piston rod of the ram 181 is connected to the blade holder 168 by a vertical pivot pin 183.

Figure 15:
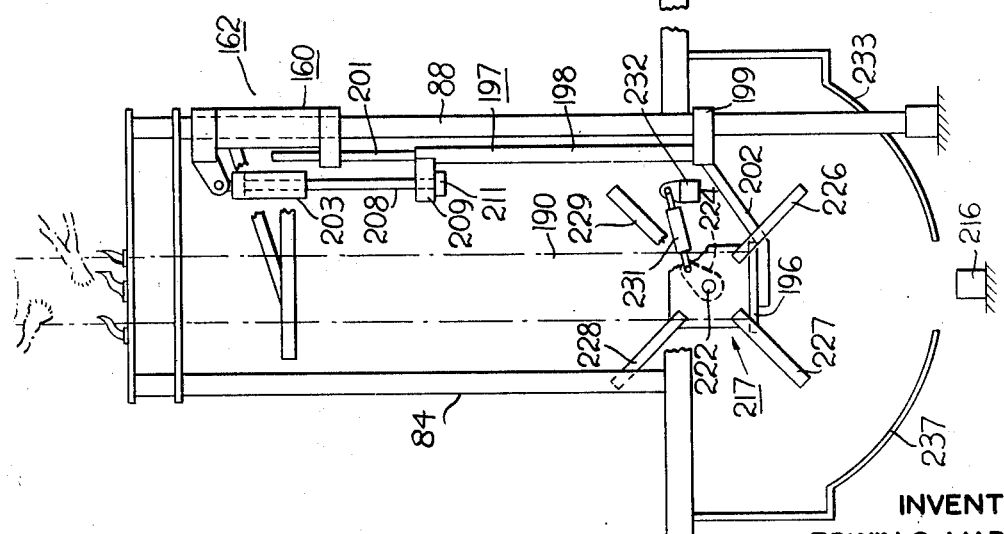
FIG. 15 is an enlarged elevational view of portions of the machine shown in FIG. 1 including the flying shear, the view of FIG. 15 being taken generally on line XV—XV of FIG. 2.

FIGS. 1 and 15 show the flying shear assembly 162 in a raised position to which it may be lifted by a vertical, elongated double acting hydraulic ram 184 best shown in FIG. 14. The barrel of the lifting ram 184 is suspended at its upper end from a bracket 186 at the upper end of the frame tube 163 by a cross pin 187 (FIG. 13), and the piston rod 188 of the ram 184 is connected to a bracket 189 on a lower frame part of the forward vehicle unit by a cross pin 191. Fluid pressure admitted through an upper port 192, and fluid pressure of equal magnitude admitted through a lower port 193 to the barrel of the ram 184 act upon the upper and lower sides of the piston 194, and since the effective pressure area of the upper piston side is larger than that of the lower piston side, the flying shear is biased upwardly and sustained in its raised position as long as equal fluid pressure is maintained at the ports 192 and 193. If the fluid pressure at the port 192 is dropped while it is maintained at the port 193, a downward thrust will be exerted upon the frame tube 163 and associated parts.

While the flying shear 162 is in its raised position as shown in FIGS. 1 and 15, the shear blades 176, 178 may be held wide open by fluid pressure in the barrel end of the cutting ram 181. A tree trunk 190 (FIG. 1) projecting from the under side of the delimbing head 77 may thus be straddled by the open shear blades 176, 178, and when the feed rolls 126 are started, the delimbed tree trunk may descend without entraining the flying shear. During such descent the vertical distance of the butt end of the tree from the horizontal plane of the open shear blades 176, 178 may increase until it has reached the desired length of the log to be cut, normally eight feet. At that moment, which is illustrated by FIG. 15, the butt end of the delimbed tree trunk engages a horizontal plate 196 which forms part of an up and down movable thrust transmitting element or shear puller generally designated by the reference character 197.

An upright tube 198 of the shear puller extends alongside the frame post 88 of the forward vehicle unit, and a guide block 199 is rigidly secured to the lower end of the tube 198 and has an up and down movable sliding connection with the frame post 88. An upward extension 201 of the tube 198 has an up and down movable sliding connection with the guide block 166 (FIG. 13) at the outer end of the flying shear arm 164. As previously explained, the guide block 166 in turn has an up and down movable sliding connection with the frame post 88.

The abutment plate 196 which, as shown in FIG. 15, is contacted by the butt end of the tree truck 190, is secured to the outer end of an arm 202 which is rigidly connected with the guide block 199 at the lower end of the shear puller tube 198. As shown in FIG. 15, the arm 202 is angled downwardly from the guide block 199, and as shown in FIG. 13, the arm 202 extends generally parallel to the longitudinal center plane of the forward vehicle unit represented by the dash-dotted line K–L. As also shown in FIG. 13, the abutment plate 196 extends transversely of the arm 202 so that it projects into the path of movement of a tree trunk descending from the delimbing mechanism 77 through the open flying shear.

The shear puller 197 is adjustably suspended from the flying shear frame 160 by means of a double acting hydraulic ram 203 shown in FIGS. 14–17. The barrel end of the ram 203 is connected by a cross pin 204 (FIG. 14) to the outer end of an arm 206 which is rigidly connected with the upper end of the frame tube 163. A brace 207 extends between the arm 206 and an intermediate portion of the frame tube 163. The piston rod 208 of the ram 203 extends slidably through a lift lug 209 which is rigidly secured, as by welding, to the upper end of the shear puller tube 198. A nut 211 on the lower end of the piston rod 208 limits downward movement of the shear puller relative to the piston rod 208.

Figure 16:
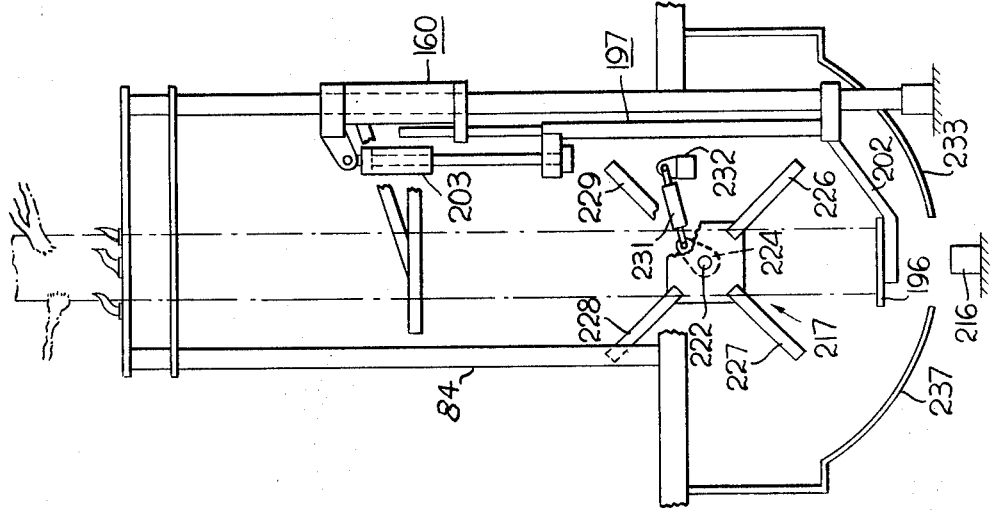

In order to adjust the shear puller to the raised position relative to the shear frame 160 in which it is shown in FIGS. 14, 15 and 16, pressure fluid may be admitted through the lower port 212 of the ram 203. When the ram has been contracted, the pressure fluid below the ram piston 213 may be trapped so that a downward thrust transmitting connection will be established between the butt end of the tree trunk 190 and the shear frame 160 through the plate 196, arm 202, tube 198, lug 209, nut 211, piston rod 208, trapped fluid below the piston 213, barrel of ram 203, pin 204 and arm 206. Accordingly, continued downward movement of the tree after its butt end has contacted the plate 196 will cause the shear frame to move downwardly from the lifted position in which it is shown in FIG. 15. Such downward movement of the shear frame will be resiliently opposed by the pressure differential within the lifting ram 184, and the downward thrust exerted by the rotating feed rolls 126 upon the tree trunk will cause pressure fluid above the piston 194 to be crowded out of the ram 184 through the port 192, as will be explained more fully hereinbelow.

When the shear frame 160 starts to move downward from its raised position in unison with the descending tree, the actuating cylinder 181 for the shear blade holders 168, 169 may be energized to move the blades 176, 178 toward each other and thereby sever a log of predetermined length from the descending delimbed tree trunk.

FIG. 16 illustrates the downward position to which the shear frame will have moved along with the descending tree when the cut by the closing of the shear blades 176, 178 has been completed. At that moment the trapped pressure fluid below the piston 213 of the ram 203 may be released and pressure fluid may be introduced into the cylinder space above the piston 213 through the upper port 214 of the ram cylinder. This will subject the shear puller to a strong downward thrust so that the cut-off log which rests on the plate 196 will drop away from the remaining upper trunk portion at a faster rate of speed than that which is imparted to the residual tree portion by the rotating feed rolls 126.

Figure 17:
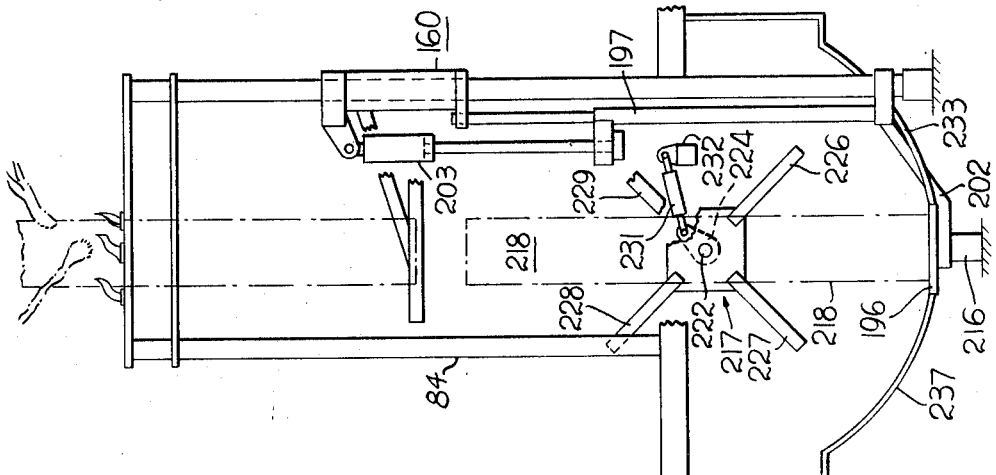
FIGS. 16 and 17 are views similar to FIG. 15 and showing the flying shear in different positions of adjustment.

FIG. 17 shows the lower limit position to which the shear puller 197 may drop when the sustaining fluid pressure below piston 213 is released and energizing pressure fluid is introduced through the port 214. A fixed abutment 216 on the frame of the forward vehicle unit is engaged by a suitable portion of the shear puller arm 202 to determine the lower limit position of the shear puller.

The speed differential between the downwardly moving log and the downwardly moving residual portion of the tree causes the upper end of the vertical log to move away from the more slowly descending residual portion of the tree. The resulting gap between the log and the residual tree portion is illustrated to an exaggerated extent in FIG. 17 and provides head room for turning the log from its vertical position either to the right or left in FIG. 17. A mechanism for effecting such turning of the log is indicated in FIGS. 15–17 and also in other figures by the reference numeral 217.

When the severing of a log from the descending tree trunk by closing of the flying shear has been completed the cutting ram 181 (FIG. 13) may be energized to swing the blade holders 168, 169 and associated blades 176 and 178 back to the open positions in which they are shown in FIG. 13. At the same time the fluid pressure above the piston 194 of the lifting ram 184 may be momentarily released while the fluid pressure upon the lower side of the piston remains effective. As a result, a positive downward force will be exerted upon the flying shear frame after the shear puller 197 has dropped from the lifted position in which it is held relative to the shear frame during the descent of the latter from the FIG. 15 to the FIG. 16 position.

Shortly after the log turning mechanism 217 has started to swing the dropped log 218 from the vertical position in which it is shown in FIG. 17, the differential pressure condition in the lift cylinder 184 may be restored so that the flying shear will return to its raised position. Moreover, when the bottom end of the log 218 has been pushed sidewise from the plate 196 by operation of the log turner 217, the shear puller may be restored to its raised position on the shear frame by admission of pressure fluid to the lower port 212 of the ram 203 FIG. 14).

LOG TURNING MECHANISM

The log turning mechanism 217 as best shown in FIGS. 1 and 3 comprises a square, vertical hub plate 219 which is supported on a horizontal, longitudinal frame bar 221 of the forward vehicle unit for rotation on a horizontal transverse axis by means of a shaft 222. A bearing 223 for the shaft 222 terminates at an axial spacing from the hub plate 219, and a rocker arm 224 (FIG. 15) is secured to the shaft 222 between the hub plate 219 and the bearing 223. Rigidly mounted on the obverse side of the hub plate, as seen in FIG. 1, are four log engaging fingers 226, 227, 228 and 229, at ninety degree spacings from each other. As seen in FIG. 3, the fingers 227 and 228 are conically inclined with respect to the axis of the shaft 222, so as to diverge outwardly from the hub plate 219. The fingers 226, 229 shown in FIG. 1 are correspondingly inclined to diverge outwardly from the hub plate 219.

A double acting hydraulic ram 231 shown in FIGS. 15–17, is pivotally mounted at its barrel end on a frame beam 232 of the forward vehicle unit, and the piston rod of the ram 231 is pivotally connected to the outer end of the rocker arm 224. Contraction of the ram 231 swings the hub plate 219 to the position shown in FIG. 15 in which the log engaging fingers 226, 227 diverge downward and the fingers 228, 229 diverge upward. Expansion of the ram 231 rotates the hub plate 219 through ninety degrees, that is, into a position in which the arms 227, 228 diverge downward and the arms 226, 229 diverge upward.

After an upright log 218, as shown in FIG. 17, has settled on the lowered abutment plate 196 it is straddled by the lower pair of fingers 226, 227 and by the upper pair of fingers 228, 229. Turning of the hub plate and fingers by an expansion stroke of the ram 231 brings the fingers 227, 229 laterally against the log 218, and as the turning of the fingers continues the lower end of the log slides from the abutment plate 196 to the right in FIG. 17 and upon an arcuate guide plate 233 which is curved concentrically about the hub shaft 222 and rigidly mounted on the frame of the forward vehicle unit.

As the lower end of the log slides upwardly along the guide plate 122 its weight will cause it to fall away from the finger 229, and the log will then be supported momentarily in a horizontal position on the fingers 227, 228. Due to the conical inclination of the fingers, as seen in FIG. 3, the horizontal log will slide sidewise down along the fingers 227, 228 and into a trough 234 (FIG. 3). As shown in FIG. 1, the trough 234 extends lengthwise of the forward vehicle unit in a horizontal position, and it is fixedly mounted in that position on the frame of the front unit. As the log settles in the trough 234 it is straddled horizontally by a pair of drive rollers of a log feeding mechanism which is generally indicated in FIG. 1 by the reference numeral 236, and which is operable to propel the log lengthwise in a rearward direction.

While the log moves horizontally rearward out of the trough 234, a second log may descend into a vertical position on the plate 196. At that time the log turning ram 231 may still be in its expanded condition so that the fingers 227, 228 diverge downwardly and the fingers 226, 229 diverge upwardly. Contraction of the ram 231 will then bring the fingers 227 and 229 laterally against the second log to turn it clockwise, as seen in FIG. 17 and as distinguished from the first log which was turned anti-clockwise by an expanding stroke of the ram 231. While the second log is turned clockwise, its bottom end slides along an arcuate guide plate 237 which, like the guide plate 233, is curved concentrically about the hub shaft 222 and rigidly mounted on the frame of the forward vehicle unit. The second log will slide sidewise into the trough 234 in the same manner as the first log, but its position in the trough will be reversed end for end with respect to the first log.

The end for end reversal of successive logs cut from the same tree is desirable for compact stacking of the logs, because the thick ends of only half the logs will then be at one side of the stack, and the thick ends of the other half of the logs will be at the other side of the stack.

LOG FEEDING MECHANISM

The log feeding mechanism which is indicated at 236 in FIG. 1 is shown more fully in FIGS. 18, 19 and 20. A pair of drive rolls 238, 239 are rotatably mounted on horizontally swingable support arms 241, 242, respectively. The support arm 241, as shown in FIG. 19, is mounted on a transverse frame tube 243 of the forward vehicle unit by means of a vertical shaft 244, and the drive roll 238 is rotatably mounted in an upright bracket 246 (FIG. 20) at the free end of the arm 241. A hydraulic motor 247 is suspended from the bracket 246 and coupled to the drive roll 238.

The support arm 242 (FIG. 18) is swingably mounted on the frame tube 243 by means of a vertical shaft 248 corresponding to the shaft 244, and the drive roll 239 is rotatably mounted in an upright bracket 249 at the free end of the arm 242 and is driven by another hydraulic motor corresponding to the motor 247.

A double acting hydraulic ram 251 is pivoted at its barrel end on the frame of the forward vehicle unit by means of a vertical pivot pin 252, a bracket plate 253 supporting the pin 252 being secured to the frame tube 243. The piston rod of the ram 251 is connected to an extension 254 of the support arm 242 by a vertical pivot pin 256. Contraction of the ram 251 swings the arm 242 to the dotted line position in which it is shown in FIG. 18, and expansion of the ram 251 swings the arm 242 from the dotted line to the full line position. A connecting link 257 extends between a lug 258 on the arm 242 and an extension 259 of the arm 241. The arms 241, 242 are thus synchronized to open the feed rolls 238, 239 by contraction of the ram 251, and to close them by expansion of the ram.

While a log settles horizontally in the trough 234, the ram 251 is contracted so that the rolls 238, 239 will be spaced laterally from opposite sides of the log. Subsequent expansion of the ram 251 then brings the rolls 238, 239 firmly against the log, and the motors 247 will rotate the rolls 238, 239 in opposite directions so that the log will be advanced horizontally toward the rearward vehicle unit and into a log straightening device generally designated in FIG. 1 by the reference numeral 261.

LOG STRAIGHTENING DEVICE

Referring to FIGS. 2 and 21–23, the frame of the rear vehicle unit comprises a forward horizontal cross tube 262 which has a hitch block 263 at its under side. The front vehicle unit is connected with the hitch block 263 by the swivel joint 6 (FIG. 1) and the log straightening device comprises a vertical shaft 264 (FIG. 22) which is secured at its upper end to the under side of the hitch block 263 and spaced transversely from the center of the swivel joint 6 at one side of the latter. Another vertical shaft 266 (FIG. 21) which is a duplicate of the shaft 264 depends from the under side of the hitch block 263 at the other side of the swivel joint 6 and at the same spacing therefrom as the shaft 264.

Pivotally mounted on the shaft 264 are two roller support arms 267, 268 which are swingable independently of each other about the shaft 264. Also mounted on the shaft 264 is an idler roller 269 (FIG. 22) which is rotatable independently of the arms 267, 268.

Figure 25:
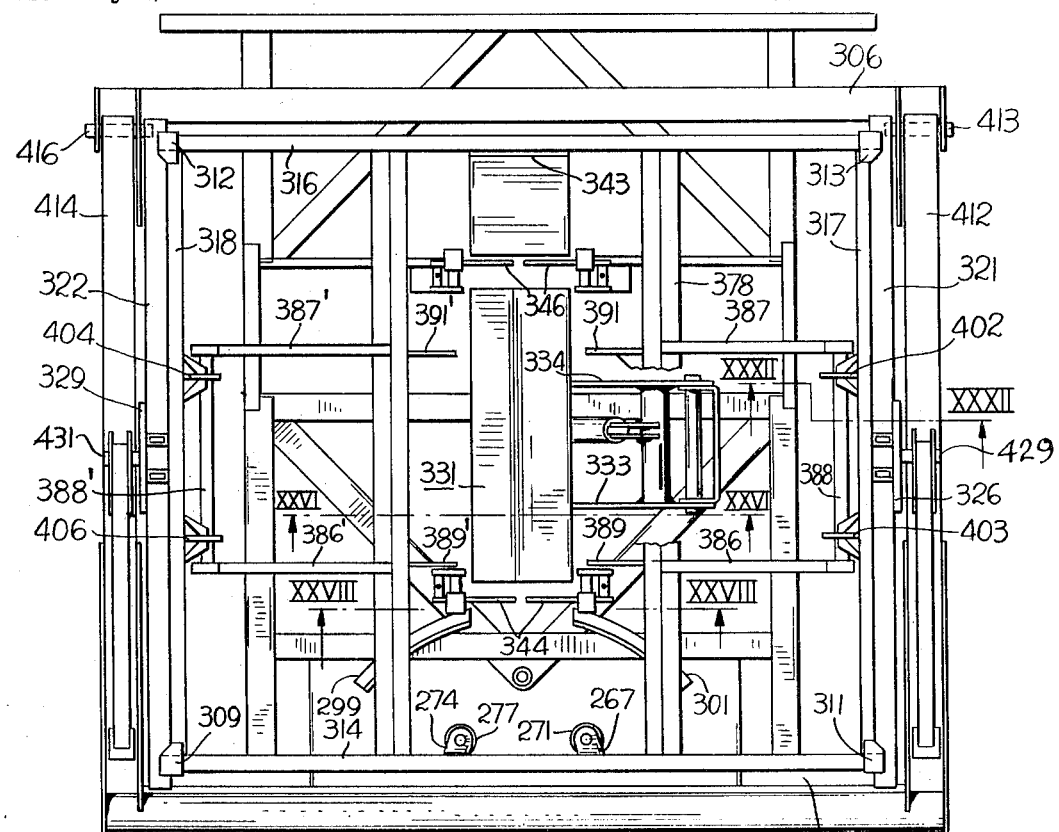
FIG. 25 is a top view of FIG. 24.

In the condition of the log straightening device as shown in FIGS. 21 and 25 the roller support arm 267 extends in a generally rearward direction, and the roller support arm 268 which is somewhat longer than the arm 267 extends in a generally forward direction from the shaft 264. A log driving roller 271 is rotatably mounted on the free end of the short arm 267, and a hydraulic motor 272 (FIG. 22) at the under side of the arm 267 has a driving connection with the roller 271. An idler roller 273 is rotatably mounted at the free end of the long arm 268.

Duplicates of the short and long arms 267, 268 are mounted on the shaft 266, and designated in FIGS. 21, 23 and 25 by the reference numerals 274 and 276, respectively. A log driving roller 277 which is driven by another hydraulic motor 272 is mounted on the free end of the short arm 274, and an idler roller 278 is rotatably mounted on the free end of the long arm 276. A center idler, not shown, corresponding to the center idler 269 is mounted on the shaft 266.

An actuating mechanism for the long arms 268, 276 (FIG. 21) comprises a double acting hydraulic ram 279 and a link 281. The barrel of the ram 279 is connected by a vertical pivot pin 282 to a frame portion 283 of the rear vehicle unit. The piston rod of the ram 279 is connected by a pivot pin 284 to the arm 276 forwardly of the shaft 266, and the link 281 is connected at one end to a rearward extension of the arm 276 by a pivot pin 286. The other end of the link 281 is connected to the long arm 268 forwardly of the shaft 264 by a pivot pin 287. Contraction and expansion of the ram 279 will move the long arms 268, 276 to diverging and converging limit positions, respectively, as shown in dotted lines in FIG. 21.

The short arms 267, 274 are similarly actuated by a double acting ram 288 (FIG. 21) and a link 289 (FIG. 23). Pivot pins 291, 292 connect the ram 288 with a frame portion 293 of the rear vehicle unit, and with the short arm 267, respectively. Pivot pins 294 and 296 (FIG. 23) connect the link 289 with a forward extension 297 of the arm 267, and with the arm 274, respectively. Contraction and expansion of the ram 288 will move the short arms 267 and 274 to diverging and converging limit positions, respectively, as shown in dotted lines in FIG. 21.

While a log is propelled rearwardly by the log feeding mechanism 236 in FIG. 1, the rams 279 and 288 (FIG. 21) of the log straightening device will be contracted so that the long arms 268, 276, as well as the short arms 267, 274 will be in their diverging limit positions as indicated in FIG. 2. A horizontal log advancing lengthwise to the rear in the longitudinal direction of the forward vehicle unit may therefore readily enter into the transverse space between the idler rolls on the shafts 264, 266 of the rear vehicle unit, regardless of whether the front and rear vehicle units are in longitudinal alignment with each other or whether they are angularly displaced, as for steering, about the center of the swivel joint 6. A horizontal guide plate 298 (FIG. 25) is rigidly secured to the rear vehicle frame below the log straightening device 261 in order to guide a rearwardly moving log horizontally into the open log straightening device. Arcuate log stops 299 and 301 (FIG. 25) are rigidly mounted on the rear vehicle frame to limit rearward movement of a log entering obliquely into the space between the idlers on shafts 264, 266.

After a rearwardly moving log has cleared the drive rolls 238, 239 (FIG. 18) of the log feeding mechanism, the rams 279 and 288 may be synchronously expanded so as to bring the rotating drive rollers 271, 277 and the idling rollers 273, 278 laterally against the rearwardly moving log. Such closing of the log straightening device will bring any obliquely positioned log between the idler rolls 269 on the shafts 264, 266 into lengthwise alignment with the rear vehicle unit in the longitudinal direction of the latter. The drive rollers 271 and 277 on the short arms 267, 274 may be driven continuously so as to propel the straightened log rearwardly under a log storage receptacle or hopper generally designated in FIG. 1 by the reference numeral 302.

In general terms, the feeding device 236 (FIG. 1) represents log transfer means which are operable to advance a horizontally positioned log lengthwise in the longitudinal direction of the front vehicle frame toward the rear vehicle frame; and the log straightening device comprises relatively opposed log engaging elements or guide members and associated actuating means which are operable to widen the relative spacing of the log guide members for straddling a log, and to shorten such spacing for bringing an oblique log into lengthwise alignment with the rear vehicle frame.

HOPPER

A rearward cross tube 306 (FIG. 25) of the rear vehicle frame is supported horizontally on an upwardly extending rear support 300 (FIG. 30). Spaced forwardly from the rear cross tube 306 and extending parallel thereto at the same level as the front cross tube 262 (FIG. 30) which is horizontally supported on an upwardly extending front support 305 (FIG. 30). Longitudinal, horizontal frame tubes 307, 308 (FIG. 24) connect the front and rear cross tubes 262 and 306 at opposite sides, respectively of the rear vehicle unit.

The hopper 302 consists of an open frame work of generally cubical configuration including vertical front posts 309, 311 (FIG. 24) and vertical rear posts 312, 313 (FIG. 25). At their upper ends the vertical front posts 309 and 311 are connected by a top cross beam 314, and the vertical rear posts 312, 313 are connected at their upper ends by a top cross beam 316 (FIG. 25). A longitudinal top beam 317 (FIG. 30) connects the upper ends of the front and rear posts 311, 313, and a longitudinal top beam 318 (FIG. 25) connects the upper ends of the front and rear posts 309, 312. The lower ends of the front posts 309, 311 (FIG. 24) are connected by a bottom cross beam 319, and the lower ends of the rear posts 312, 313 are similarly connected by a corresponding bottom cross beam, not shown. The lower ends of the front and rear posts 311, 313 (FIG. 30) are connected by a longitudinal bottom beam 321, and the lower ends of the front and rear posts 309, 312 (FIG. 25) are similarly connected by a longitudinal bottom beam 322 (FIG. 25) corresponding to the longitudinal bottom beam 321. A pair of upwardly converging suspension beams 323, 324 (FIG. 30) are connected at their lower ends to the front and rear ends of the longitudinal bottom beam 321 (FIG. 30), and a lift bracket 326 is secured to the upper ends of the beams 323, 324 and to the top beam 317. Vertical braces 327 and 328 extend downwardly from midportions of the suspension beams 323, 324 respectively, and are connected at their lower ends to the longitudinal bottom beam 321. The longitudinal bottom beam 322 (FIG. 25) and the longitudinal top beam 318 are similarly connected by converging suspension beams and braces; and a suspension bracket 329 (FIG. 25) corresponding to the suspension bracket 326 (FIG. 30) is secured to the top beam 318 and associated suspension beams.

In the seated position of the hopper 302 on the rear vehicle unit as shown in full lines in FIG. 30 the longitudinal bottom beams 321 and 322 of the hopper rest on the longitudinal frame tubes 308, 307 (FIG. 24), respectively, of the chassis of the rear vehicle unit. Also in the seated position of the hopper, its bottom aperture which is defined by the longitudinal lower beams 321, 322 (FIG. 25) and their associated front and rear cross beams, extends in a horizontal plane substantially above the horizontal plane in which a cut log is propelled rearwardly by the drive rollers of the log straightening device 261 (FIG. 30).

When the actuating rams 279, 288 (FIG. 21) of the log straightening device are expanded, a log straddled by the forward guide rollers 273, 278 and by the rearward drive rollers 271, 277 will be presented for lengthwise rearward travel centrally of the rear vehicle unit in the longitudinal direction of the latter. An elongated log support 331 (FIG. 25) is mounted on the frame of the rear vehicle unit in rear of the log straightening device for sustaining a log which is propelled rearwardly by the drive rollers 271, 277 and for elevating the log, after it has cleared the rollers 271, 277, into the hopper 302 through the bottom opening of the latter.

Figure 24:
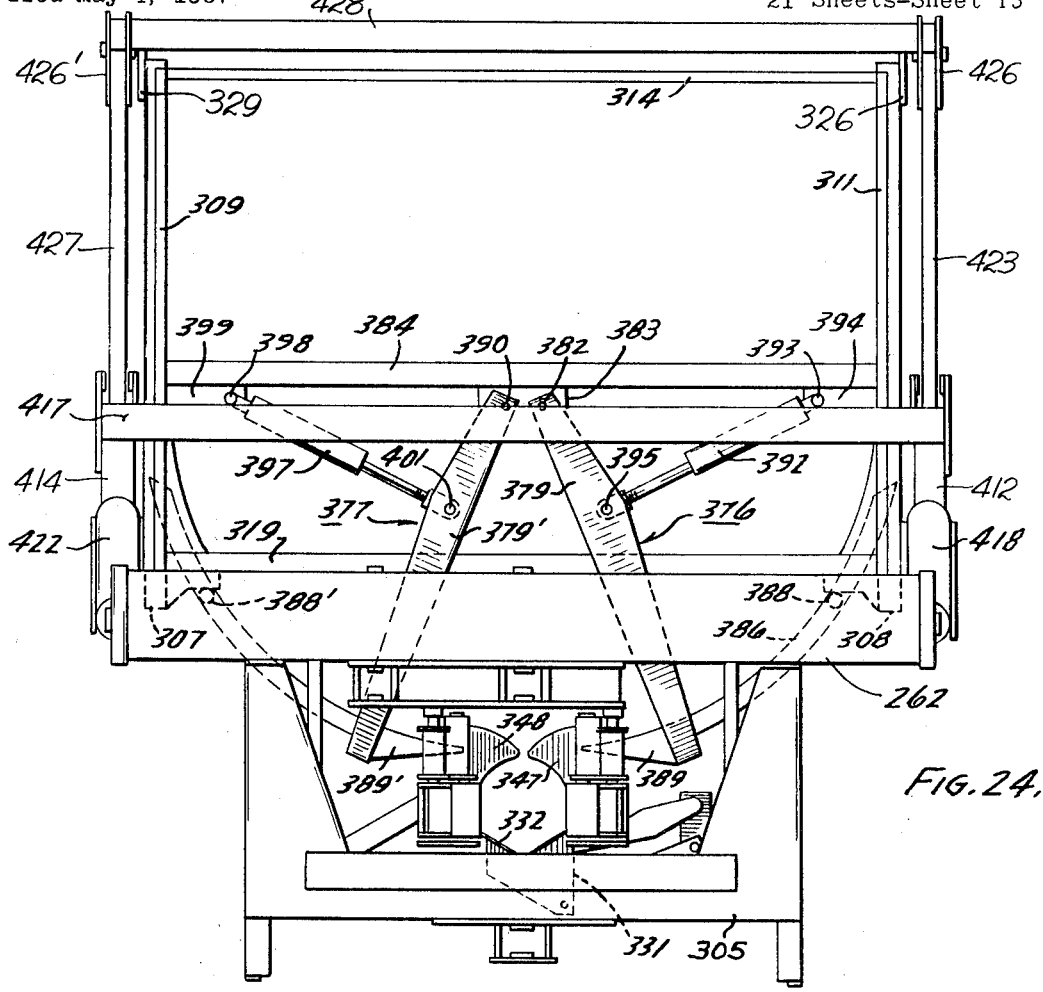
FIG. 24 is an end view of a log hopper and associated parts, the view of FIG. 24 being taken generally on line XXIV—XXIV of FIG. 1.
Figure 26:
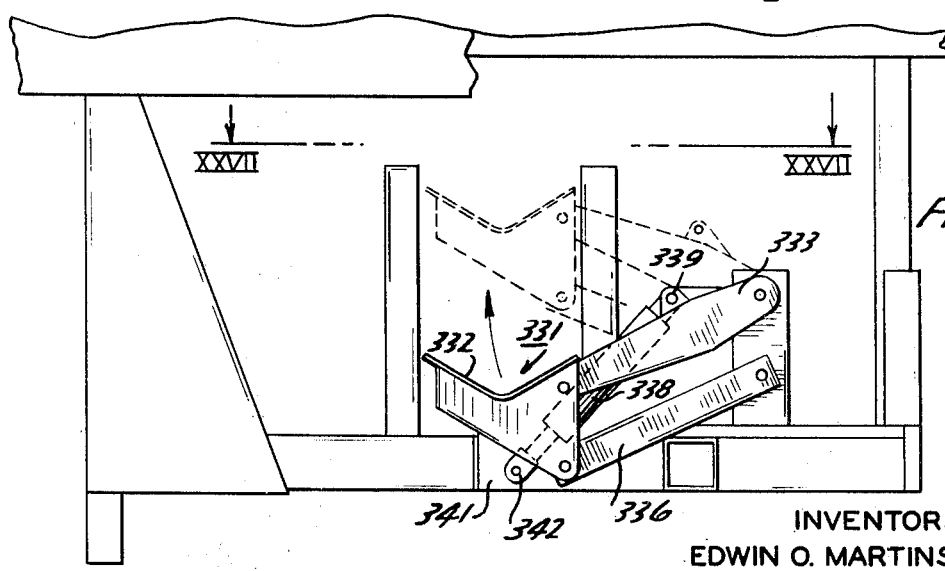
FIG. 26 is a section on line XXVI—XXVI of FIG. 25 showing an end view of a log lifting mechanism partly shown in FIG. 24.
Figure 27:
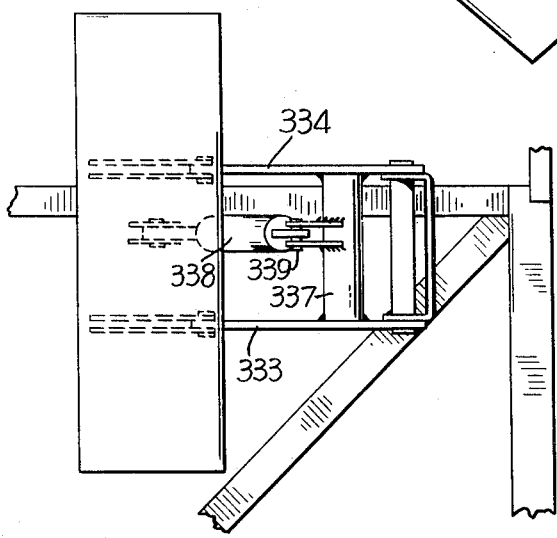
FIG. 27 is an enlarged top view of the log lifting mechanism shown in FIG. 26.

Referring to FIGS. 25 and 26, the log support 331 comprises a trough like top plate 332 presenting a V-shaped cavity in which a log may settle in a centered position below the hopper. The plate 332 is mounted on the rear vehicle frame for translatory up and down movement between lowered and raised positions (FIG. 26) by means of a parallelogram linkage which comprises an upper link having spaced arms 333, 334 (FIG. 27), and a similarly constructed lower link 336 (FIG. 26). A spacer tube 337 (FIG. 27) between the arms 333, 334 of the upper link is connected with the barrel of a double acting hydraulic ram 338 by a pivot pin 339 and the piston rod of the ram 338 (FIG. 26) is connected to a frame portion 341 of the rear vehicle unit by a pivot pin 342. Contraction of the ram 338 brings the support plate 332 to the lowered position in which it is shown in FIGS. 24 and 26 and expansion of the ram brings the support plate to the raised position in which it is shown in dotted lines in FIG. 26.

Rotation of the drive rolls 271, 277 of the log straightening mechanism may advance a log upon the lowered log support plate 332. A stop plate 343 (FIG. 1) is fixedly mounted on the rear vehicle frame in rear of the log support 331 to determine a lengthwise centered position of the log on the V-shaped plate 332. The length of the plate 332 is somewhat shorter than the length of a log which is determined by the hereinbefore explained operation of the flying shear mechanism shown in FIGS. 13–17. Accordingly, when the rearwardly leading end of the log abuts the stop plate 343, opposite end portions of the log will overhang the front and rear edges of the plate 332. As the log is lifted by an expansion stroke of the ram 338 its forwardly overhanging end portion is forced upwardly through a one-way front gate mechanism generally indicated at 344 in FIG. 25; and the rearwardly overhanging end portion of the log is simultaneously forced upwardly through a one-way rear gate mechanism 346 which is essentially a duplicate of the front gate mechanism 344.

Figure 29:
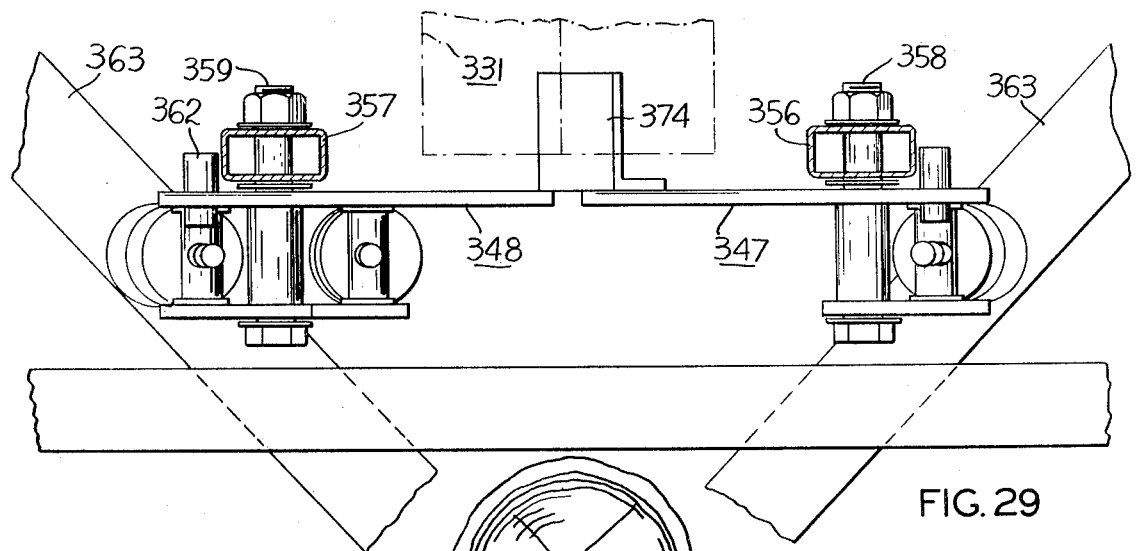
FIG. 29 is a top view of FIG. 28.
Figure 28:
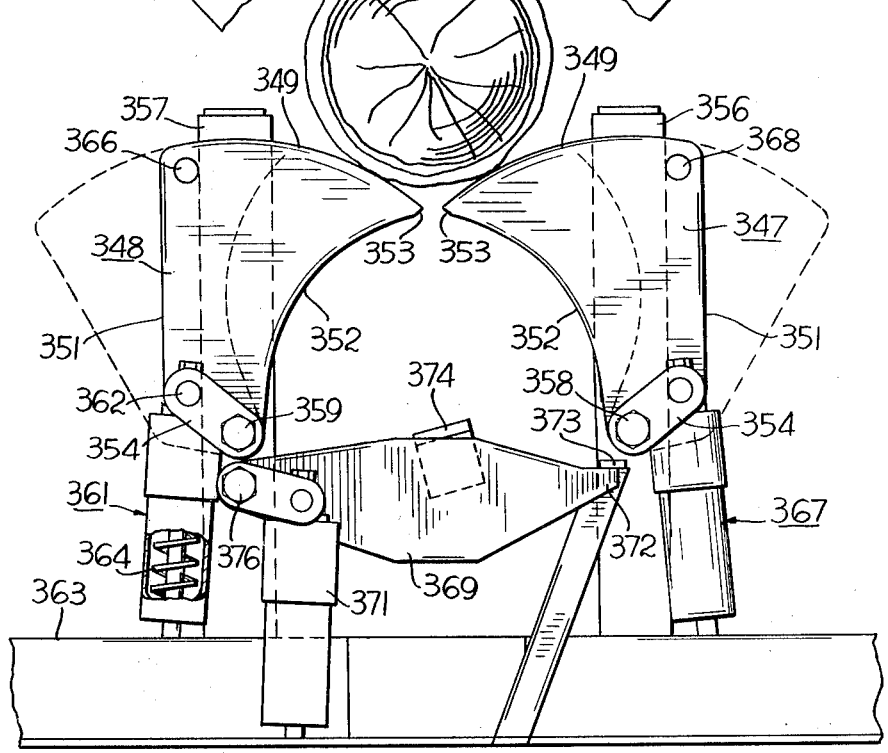
FIG. 28 is a section on line XXVIII—XXVIII of FIG. 25 showing an end view of a front gate assembly partly shown in FIG. 24.

Referring to FIGS. 28 and 29, the front gate mechanism comprises two opposite hand cam plates 347, 348. Each cam plate presents a convexly curved top edge 349, a straight outer side edge 351, a concavely curved inner side edge 352 which merges with the top edge to form a tip 353, and an upwardly and outwardly inclined bottom edge 354 connecting the lower ends of the inner and outer side edges 351, 352. The cam plates 347, 348 are pivotally mounted at their lower ends on vertical frame posts 356, 357, respectively, of the rear vehicle unit for swinging movement in a common transverse plane about spaced pivot bolts 358, 359, respectively, so that their tips 353 may move toward and away from each other by inward and outward swinging, respectively, of the cam plates. A resiliently compressible buffer unit 361 is connected at one end with a pivot pin 362 of the cam plate 348, and bears at its other end upon a diagonal frame member 363 of the rear vehicle unit. The buffer unit 361 includes a coil spring 364 which tends to swing the cam plate 348 clockwise about the pivot bolt 359, as seen in FIG 28, into a limit position which is determined by engagement of a stop pin 366 on the cam plate 348 with the frame post 357. The cam plate 347 is similarly urged in anti-clockwise direction about its pivot bolt 358 by a buffer unit 367, a stop pin 368 engaging the frame post 356 to determine the limit position in which the cam plate 347 is shown in FIG. 28.

The foregoing explanations of the one-way front gate mechanism 344 analogously apply to the one-way rear gate mechanism 346.

In the condition of the front gate as illustrated by FIG. 28 the arcuate edges 352 of the cam plates 347, 348 will arch over the forward portion of a log lying on the lowered log support 331 (FIG. 25) and the cam plates of the rear gate will similarly arch over the rearward portion of the log. Raising of the log by an expansion stroke of the ram 338 (FIG. 26) will bring its forward and rearward ends against the arcuate edges 352 of the closed front and rear gates. As the ram 338 continues to expand the front and rear gates will be cammed open in opposition to the closing force of the buffer units 361, 367. When the log passes beyond the tips 353 of the cam plates the gates will snap back into their closed positions, and the log will settle on the converging arcuate top edges 349 of the closed cam plates as illustrated by FIG. 28.

In order to preclude any possibility of a log being propelled rearwardly through the front gate 344 (FIG. 25) before the log support 331 has returned to its lowered log accepting position, an up and down swinging stop gate 369 (FIG. 28) is mounted on the frame of the rear vehicle unit below and in the same plane as the cam plates 347, 348 of the front gate. A buffer unit 371, which encloses an axial coil spring like the buffer unit 361 and 367, urges the stop gate upwardly into its blocking position in which an abutment 372 at the radially outer end of the stop gate engages a complementary fixed abutment 373 on the frame of the rear vehicle unit.

A cam lug 374 is secured to the stop gate at a radial distance from its pivot bolt 376, and as shown in FIG. 29 the cam lug 374 projects rearwardly from the stop gate into the path of travel of the log support 331. The relative arrangement of the cam lug 374 and log support 331 is such that downward movement of the log support into its log accepting position engages the cam lug 374 and forces the stop gate 369 into a lowered log clearing position. Followup movement of the stop gate 369 when the log support 331 is raised brings the stop gate into the log stopping position in which it is shown in FIG. 28.

Successive rearward feeding of logs by the drive rollers of the log straightening device, and coordinated raising and lowering of the log support 331 will elevate a number of logs, one after the other, through the one-way gates 344 and 346. In order to accumulate the elevated logs in the hopper 302, a pair of back and forth swingable log retainers 376, 377 (FIG. 24) are pivotally mounted on the hopper.

Generally, the log retainer 376 as shown in FIGS. 24, 25 and 31, comprises an elongated beam 378 of substantially the same length as the longitudinal bottom beam 321 (FIG. 30) of the hopper frame. Rigidly secured to one end of the beam is a suspension arm 379 (FIG. 31), and a similar suspension arm 381 is rigidly secured to the other end of the beam 378. As shown in FIGS. 24 and 31, the free end of the suspension arm 379 is swingably connected by a horizontal pivot pin 382 to a bracket at the under side of a horizontal cross bar 384 which is rigidly connected at its opposite ends with the vertical front posts 309, 311 of the hopper frame above the bottom cross beam 319. The suspension arm 381 (FIG. 31) at the other end of the beam 378 is similarly suspended from a horizontal cross bar 385 between the vertical rear posts 312, 313 of the hopper frame for swinging movement on a rearward pivot pin 382′ in longitudinal alignment with the forward pivot pin 382. The pivot front and rear suspension arms 379 and 381 maintain the beam 378 parallel to the longitudinal side beam 321 (FIG. 30) of the hopper frame and they permit lateral back and forth swinging of the beam while the hopper is in its seated position on the rear vehicle frame as shown in FIG. 30.

Rigidly secured to a midportion of the beam 378 intermediate its ends are two arcuate log supporting arms 386 and 387. The arm 386, as shown in FIGS. 24 and 31, is curved concentrically with the pivot pin 382 and extends laterally outward and upward from the beam 378. The arm 387 is a duplicate of the arm 386 and is spaced therefrom in the longitudinal direction of the beam 378. A spacer tube 388 between the arms 386, 387 extends parallel to the beam 378 and is spaced from the latter a predetermined transverse distance so that it may serve to lock the hopper to the rear vehicle frame as will be explained more fully hereinbelow. A triangular extension plate 389 (FIG. 24) of the arcuate log supporting arm 386 is secured to the beam 378 at the side of the latter which faces the log support 331 (FIG. 25), and a similar extension plate 391 extends from the beam 378 in alignment with the arcuate log supporting arm 387.

The foregoing explanations of the log retainer 376 analogously apply to the log retainer 377 which is an opposite hand duplicate of the log retainer 376. A longitudinal forward pivot pin 390 and a complementary rearward pivot pin 390' (FIG. 31) for the log retainer 377 are alined on a horizontal axis which extends parallel to the axis for the alined pivot pins 382, 382'.

Double acting hydraulic rams 392, 392' (FIG. 31) for swinging the log retainer 376 back and forth on the hopper frame are connected by pivot pins 393, 393' to brackets 394, 394' on the front and rear cross bars 384, 385, respectively, of the hopper frame. The piston rods of the rams 392, 392' are conected to the suspension arms 379, 381 by pivot pins 395 and 396, respectively.

Another pair of double acting hydraulic rams 397, 397' for swinging the log retainer 377 back and forth on the hopper frame are connected by pivot pins 398, 398' to brackets 399, 399' on the front and rearward cross bars 384, 385, respectively, of the hopper frame. The piston rods of the rams 397, 397' are connected to the suspension arms 379', 381' by pivot pins 400 and 401, respectively.

Figure 32:
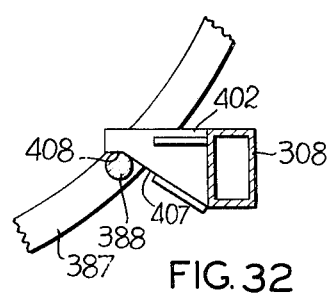
FIG. 32 is a view of a latch detail, the view of FIG. 32 being taken generally on line XXXII—XXXII of FIG. 25.

When the hopper is in the seated position on the rear vehicle frame as shown in FIGS. 24 and 30, and pressure fluid is admitted to the gland ends of the rams 392, 392' and 397, 397', outward swinging movement of the log retainers 376, 377 about their pivot pins 382, 382' and 390, 390', respectively, is limited by engagement of their respective spacer tubes 388, 388' with a pair of stops or stationary catch lugs 402, 403 (FIG. 25) on the frame bar 308 (FIG. 24), and with a pair of stops 404, 406 (FIG. 25) on the frame bar 307 (FIG. 24) of the rear vehicle unit. As shown in FIG. 32, the stop 402 comprises a vertical plate which is secured to the frame bar 308' and presents an inwardly and upwardly inclined bottom edge 407, and a short lower edge portion 408 extending horizontally from the upper end of the inclined bottom edge 407. The stop 403 which is located on the longitudinal frame bar 308 at a forward spacing from the stop 402 is similarly constructed. The same explanations apply to the stops 404, 406 (FIG. 25) on the longitudinal bar 307 (FIG. 24) of the rearward vehicle frame.

In the condition of the parts as shown in FIG. 24 the tubular spacer 388 of the log retainer 376 is urged upward into firm engagement with the bottom edges of the stops 402, 403 by fluid pressure tending to contract the rams 392, 392'. Similarly the tubular spacer 388' of the log retainer 377 is urged upward into firm engagement with the bottom edges of the stops 404, 406 on the longitudinal frame bar 307 by fluid pressure tending to contract the rams 397, 397'. Consequently, the hopper 302 will be locked to the rear vehicle frame while the tips of the extension plates 389, 389', and 391, 391' (FIG. 31) are spaced a sufficient distance apart so as to provide clearance for horizontal logs moving upward through the front and rear gates 344, 346. As successive logs are elevated above the front and rear gates, they are crowded into the space above the arcuate arms 386, 387 and 386', 387' of the log retainers, and they will eventually fill the hopper in a compactly stacked condition, the wide ends of half of the logs lying in the forward part of the hopper and the wide ends of the other half of the logs lying in the rearward part of the hopper.

When a desired number of logs has been accumulated in the hopper, fluid pressure may be admitted into the barrel ends of the rams 392, 392' and 397, 397' in order to swing the log retainers toward each other and thereby close the gaps between the triangular extension plates 389, 389' and 391, 391'. At the same time the tubular spacers 388, 388' will withdraw from the stops 402, 403 and 404, 406, respectively, so that the hopper becomes unlocked from the rear vehicle frame. A hoist generally indicated in FIG. 30 by the reference numeral 409 is mounted on the rear vehicle frame for lifting the loaded hopper from its seated position in which it is shown in full lines in FIG. 30, and for then swinging the hopper into a rearwardly overhanging unloading position behind the rear vehicle frame, as indicated in dotted lines in FIG. 30. After the hopper has been maneuvered into the unloading position, fluid pressure may be admitted into the gland ends of the rams 392, 392' and 397, 397' so that the log retainers 376 and 377 will swing wide open and the accumulated logs may drop through the bottom aperture of the hopper. If desired, a truck may be pulled up behind the rear vehicle unit and the logs may be dropped upon the truck body which is indicated by dotted lines 411 in FIG. 30.

After the hopper has been unloaded, the log retainers 376, 377 may be swung into their fully closed positions, and the hopper with the closed log retainers may be moved back into its seated position on the frame of the rear vehicle unit. Subsequent outward swinging of the log retainers 376, 377 will then relock the hopper on the rear vehicle frame.

HOPPER HOIST

The hopper hoist 409 of the rear vehicle unit comprises a side arm 412 (FIG. 30) which has a pivot connection 413 with the rear cross bar 306 at one end of the latter as shown in FIG. 25. Another side arm 414 (FIG. 25) which is a duplicate of the side arm 412 has a pivot connection 416 with the rear cross bar 306 at the other end of the latter. The pivot connections 413, 416 are horizontally alined, and the swinging ends of the side arms 412, 414 are rigidly interconnected by a transverse tube 417. A lifting ram 418 (FIG. 30) is connected at its barrel end with the forward tube support 305 by a pivot pin 419, and the piston rod of the ram 418 is connected to the hoist arm 412 by a pivot pin 421. Another lifting ram 422 (FIG. 24) which is a duplicate of the ram 418 is operatively interposed in the same manner between the forward tube support 305 and the hoist arm 414.

A hopper support arm 423 (FIG. 30) has a pivot connection 424 with the side arm 412, and at its swinging end the arm 423 has a fixed bracket 426. Similarly mounted on the other side arm 414 is a hopper support arm 427 (FIG. 24) which is a duplicate of the arm 423 and has a bracket 426' at its swinging end. A horizontal tie bar 428 (FIG. 24) is rigidly connected at its opposite ends with the brackets 426, 426'. A transverse pivot pin 429 (FIG. 30) connects the bracket 426 with the adjacent suspension bracket 326 at one side of the hopper, and a complementary pivot pin 431 (FIG. 25) connects the bracket 426' (FIG. 24) with the adjacent suspension bracket 329 (FIG. 25) at the opposite side of the hopper.

The hopper support arm 423 is braced on the hoist side arm 412 by a double acting ram 432 (FIG. 30) which is connected at its barrel end with the arm 412 by a pivot pin 433 and whose piston rod is connected with the bracket 426 by a pivot pin 434. The hopper support arm 427 (FIG. 24) is similarly braced on the hoist side arm 414 by a companion ram, not shown, which is a duplicate of the ram 432.

The alined pivot pins 429 and 431 afford a pendulum suspension of the hopper 302 on the hopper hoist 409. An expansion stroke of the lifting rams 418, 422 from their contracted condition will swing the hopper from its seated loading position on the rear vehicle frame in which it is shown in full lines in FIG. 30, to an unloading position in rearwardly overhanging relation to the frame of the rear vehicle unit as indicated in dotted lines in FIG. 30. The bracing ram 432 on the side arm 412 and its companion ram on the side arm 414 are hydraulically locked after they have been extended or contracted to a desired length for spotting the hopper over a selected place of discharge, such as the truck body 411 in FIG. 30. After the hopper has been unloaded it may be returned to its loading position on the rear vehicle frame by a contracting stroke of the lifting rams 418, 422 and, if necessary, by corrective adjustment of the bracing rams.

HYDRAULIC CIRCUIT

FIG. 33 shows a diagram of a hydraulic circuit for actuating the delimbing head which has been described hereinbefore with reference to FIGS. 10, 11 and 12.

The stationary and swingable housing sections 78, 79 are symbolically indicated and shown in their open tree accepting condition. The interlinked series of delimbing knives 117 and associated feed rollers 126 are likewise symbolically indicated and shown in retracted condition. The drive motors for the feed rollers are designated by the reference characters $M_1$.

A pump $P_1$ which is incorporated in the pump unit 11 of the forward vehicle unit, draws fluid from sump and feeds it through a check valve 436 into a main pressure line 437 and into an associated accumulator 438. A branch 439 of the pressure line 437 leads to a manually operable, self-locking two position reversing valve 441. As shown, the valve 441 is in a delimber open position and directs pressure fluid to the gland end of ram 149 tending to hold the housing sections 78, 79 apart. At the same time, pressure fluid flows to the barrel end of the ejector ram 158 tending to hold the ejector arm 154 in its tree ejecting position. Also, while the valve 441 in its delimber open position pressure fluid flows to the barrel end of ram 139 tending to hold the delimbing knives 117 and feed roller 126 in their retracted positions.

Sidewise movement of an elevated tree into the open delimbing head will be yieldingly resisted by the fluid pressure in the barrel end of the ejector ram 158, and as the tree is forced against the free end of the ejector arm 154 the resulting fluid displacement from the barrel end of the ram 158 will be absorbed by the accumulator 438.

Manual shifting of the valve 441 from the position shown in FIG. 33 to its self-locking, delimber closing position connects the pressure line branch 439 with the barrel end of the cylinder 149 and with the gland ends of the rams 158 and 139. As a result, the delimbing head will be closed, the ejector arm 154 will be swung to its tree clearing position, and the delimbing knives and feed rollers will close in on the trunk of the encircled tree trunk.

The drive motors $M_1$ of the feed rolls 126 are energized by a pump $P_2$ which, like the pump $P_1$ is incorporated in the pump unit 11 of the forward vehicle unit. Flow of pressure fluid from pump $P_2$ to the motors $M_1$ is controlled by a three position, manually operable self-locking valve 442 which as shown in FIG. 33, is adjusted to a non-driving position. Manual shifting of the valve 442 from its center position in one direction to its self-locking position, after the delimbing head has been closed, causes downward feed of the encircled tree; and manual shifting of the valve 442 in the opposite direction which is optional, causes upward feed of the encircled tree.

Upon adjustment of the valve 442 to its downward feed position, limbs and branches of the descending tree are severed from the trunk by the stationary delimbing knives 117. As the tree continues to descend the feed rollers bearing radially against its trunk will gradually move inward toward the center of the closed delimbing head to the natural taper of the trunk. When the trunk portion presented to the feed rollers has a diameter of less than a desired minimum size, say four inches, a spring biased two-position pilot valve 443 is shifted by an actuating connection 444 with one of the horizontally swingable roller support arms, as for instance the arm 104 in FIG. 10, within the stationary housing section 78 of the delimbing head. The pilot valve 443 controls an auxiliary fluid line 446 which communicates with releasing cylinders 447, 448 of the self-locking valves 441 and 442, respectively. The auxiliary fluid line 446 is temporarily pressurized after the blades of the flying shear have been closed, as will be explained more fully hereinbelow, and shifting of the pilot valve 443 by the actuating connection 444 will connect the pressurized auxiliary line 446 with the releasing cyilnders 447 and 448. As a result, the delimbing head will be opened and the ejector arm 154 will be swung into its tree ejecting position whenever a tree trunk or a tree trunk portion of less than a predetermined diameter is presented to the inwardly urged feed rollers 126.

FIG. 34 shows a diagram of a hydraulic circuit for actuating the flying shear and log turning mechanisms which have been described hereinbefore with reference to FIGS. 13 through 17.

The flying shear frame 160 and its associated blade holders 168, 169, cutting ram 181, lifting ram 184, shear puller 197 and suspension ram 203 are symbolically indicated and schematically interrelated in FIG. 34. Also symbolically indicated in FIG. 34 is the log turning mechanism or spider 217 together with its turning ram 231.

The main pressure line 437 which is supplied with pressure fluid by the pump $P_1$ (FIG. 33) has a branch line 449 which leads to the gland end of the lifting ram 184 and to the gland end of the shear puller suspension ram 203. Another branch line 451 of the main pressure line 437 leads to a pilot operated reversing valve 452 and to a mechanically operated spring biased pilot valve 453, both mounted on the frame of the flying shear for up and down movement in unison therewith.

The pilot operated reversing valve 452 is shown in FIG. 34 adjusted to a shear lifting position in which it connects the branch line 451 with the barrel end of the lifting ram 184. Also, the barrel end of the shear puller suspension ram 203 is connected to sump while the valve 452 is in its shear lifting position. In the condition of the parts as shown in FIG. 34 the same hydraulic pressure is admitted to the gland and barrel ends of the lifting ram 184, and since it is effective on a larger piston area in the barrel end than in the gland end of the lifting ram, the shear frame will be urged to its raised position in which it is shown in FIG. 15. At the same time, the shear puller 197 will be urged to its raised position relative to the shear frame by the hydraulic pressure in the gland end of the suspension ram 203, the barrel end of the ram 203 being connected to sump by the valve 452.

A separate pump $P_3$ (FIG. 34) feeds pressure fluid into the gland end of the blade actuating ram 181 through a pressure line 454 containing a check valve 456 and associated accumulator 457. Fluid flow from the pressure line 454 to the barrel end of the ram 181 is controlled by a pilot operated reversing valve 458. Adjustment of the valve 458 to its shear open position in which it is shown in FIG. 34 admits the same fluid pressure to the barrel end of the ram which is admitted to its gland end, and the resulting expansion of the ram will move the flying shear to its fully open condition. The horizontal cutting plane of the flying shear blades and the abutment plate 196 of the shear puller 197 are spaced a vertical distance from each other which in the raised position of the shear puller as shown in FIGS. 15 and 34 is equal to the desired length of the log to be cut, normally eight feet. Therefore, the shear puller, and with it the shear frame, will start moving downward when a delimbed trunk portion of the desired log length has moved downward through the open blades of the flying shear.

Initial downward movement of the shear frame from its raised position will initiate a closing stroke of the cutting ram 181. For that purpose a spring biased pilot valve 459 is mounted on the frame of the flying shear for up and down movement in unison therewith. In its shear open position, as shown in FIG. 34, the pilot valve 459 connects the shift cylinder 461 of the reversing valve 458 with sump, and initial downward movement of the flying shear from its raised position causes a temporary shift of the pilot valve 459 into a shear closing position by downward movement of the valve 459 past a stationary actuating lug 462 on the forward vehicle frame. The temporary shift of the pilot valve 459 admits pressure fluid from line 454 to the shift cylinder 461 of valve 458 and, as a result, the valve 458 will be shifted to its shear closing position in which it connects the barrel end of ram 181 with sump. The remaining fluid pressure in the gland end of ram 181 will cause the blades of the flying shear to cut into the delimbed tree trunk from opposite sides, while the tree, shear puller and shear frame continue to move downward under the downward thrust of the feed rollers 126 (FIG. 33) of the delimbing head. Fluid displacement from the barrel end of the lifting cylinder 184 during downward movement of the flying shear by the descending tree will be absorbed by the accumulator 438 (FIG. 33).

Upon completion of the cutting stroke of the ram 181, a mechanical actuating connection 463 (FIG. 34) between the blade holder 169 and the pilot valve 453 causes temporary shifting of the pilot valve 453 from the shear frame and shear puller lifting position in which it is shown in FIG. 34 to a shear frame and shear puller dropping position in which it connects the branch line 451 of the main pressure line 437 with the auxiliary fluid line 446. As already explained, the auxiliary line 446 communicates with the releasing cylinders 447, 448 (FIG. 33), and as shown in FIG. 34 it also communicates with shift cylinders 464 and 466 of the pilot operated valves 452 and 458, respectively. Upon completion of a cut by the flying shear, the valve 452 will be shifted by admission of pressure fluid to its shift cylinder 464, and as a result pressure fluid from line 451 will be admitted to the barrel end of the shear puller suspension cylinder 203 causing the shear puller to drop with respect to the downwardly moving shear frame. Fluid displacement from the gland end of the suspension cylinder 203 will be absorbed by the gland end of the lifting cylinder 184 and by the accumulator 438 (FIG. 33). Shifting of the valve 452 into its shear frame and shear puller dropping position also connects the barrel end of the lifting cylinder 184 to sump while the gland end of the lifting ram 184 remains connected with the main pressure line 437 through the branch line 449. As a result, downward thrust will be exerted upon the flying shear independently of the downwardly moving tree when a delimbed log has been severed therefrom by closing of the flying shear blades.

Shifting of the pilot valve 453 by the mechanical actuating connection 463 upon completion of a cut by the ram 181 also admits pressure fluid to the shift cylinder 466 of the valve 458. The opposite shift cylinder 461 of this valve is at this time connected to sump by the valve 459 which was automatically returned by its spring bias to the position shown in FIG. 34 upon downward movement of the shear frame past the valve actuating lug 462. Fluid pressure admitted to the shifting cylinder 466 upon completion of a cut restores the valve 458 to its shear open position shown, and the shear blades will therefore start to open immediately after completion of a cut.

Arrival of the shear puller at its lowered limit position as shown in FIG. 17 initiates rotation of the log turning spider 217 by either an expansion or contracting stroke of the spider turning ram 231. For that purpose, a spring biased mechanically operated pilot valve 467, a mechanically operated reversing valve 468, and a pilot operated reversing valve 469 are mounted on the forward vehicle frame and are connected with fluid lines as shown in FIG. 34.

The valve 467 controls flow of pressure fluid from a branch 471 of the main pressure line 437 into an auxiliary fluid line 472 which leads to the reversing valve 468. The valve 467 is urged by its spring bias into a flow blocking position in which it is shown in FIG. 34. An actuating lug 473 for the valve 467 is connected with the shear puller 197, by which the valve 467 is shifted in opposition to its spring bias into a flow establishing position when the shear puller 197 arrives at its lowered limit position.

In the condition of the log turning mechanism as shown in FIG. 34, fluid pressure admitted into the line 472 will pass through the valve 468 into the shift cylinder 474 of the pilot controlled reversing valve 469. As a result, the valve 469 will be shifted from the ram contracting position in which it is shown to a ram expanding position in which it connects a branch line 476 of the main pressure line 437 with the barrel end of the log turning ram 231. The log turning spider 217 will therefor start a ninety degree turn in clockwise direction, as seen in FIG. 34, when the abutment plate 196 of the shear puller and a severed upright log thereon have arrived at their lowered limit position.

A ninety degree clockwise turn of the spider 217 by an expansion stroke of the ram 231 has three effects. First, it delivers a cut log into the horizontal trough 234 of the forward vehicle unit; second it actuates a lost motion shifting device 477 for the reversing value 468; and third, it actuates a spring biased pilot valve 478 which controls flow of pressure fluid from a branch 479 of the main pressure line into an auxiliary line 481.

The pilot valve 478 has a mechanical actuating connection 482 with the spider 217 which shifts the valve from the flow blocking position in which it is shown in FIG. 34 to a flow establishing position shortly after the spider 217 has started its right hand turn. The auxiliary line 481 which is thus pressurized leads to the shift cylinder 482 of the pilot controlled valve 452. As already explained, the valve 452 is shifted from its shear frame and shear puller lifting position in which it is shown in FIG. 34, into its shear frame and shear puller dropping position upon completion of a cutting stroke of the ram 181. Admission of pressure fluid to the shifting cylinder 482 of the valve 452 shortly after the spider 217 has started a right hand turn will restore the valve 452 to its shear frame raising position shown. Accordingly, the shear frame and shear puller will be lifted as soon as a vertical log on the lowered abutment plate 196 has been turned to clear the plate for a return movement of the flying shear and shear puller to their raised positions.

When the shear puller 197 rises from its lowered limit position the valve 467 returns to its flow blocking position, and the valve 469 remains in its ram expanding position during the return movement of the flying shear and shear puller to their raised positions. However, the valve 468 is actuated by the lost motion connection 477 with the spider 217 so as to connect the line 472 with the shift cylinder 483 of the valve 469 and connect the shift cylinder 474 to sump at the end of a ninety degree right hand turn of the spider 217. When the line 472 becomes again pressurized upon descent of a new log into its upright lowered position, the shift cylinder 483 will adjust the valve 469 to the ram contracting position in which it is shown in FIG. 34, and the new log will be turned ninety degrees anti-clockwise as seen in FIG. 34. The alternate shifting of the valve 468 at the end of each ninety degree turn of the spider 217 results in the end for end reversal of successive logs which has been mentioned hereinbefore.

Admisison of fluid pressure into the auxiliary line 481 by the valve 478 shortly after the spider 217 has started a ninety degree turn in either direction also initiates rearward removal of the turned log from the trough 234 of the forward vehicle unit.

FIG. 35 shows a diagram of a hydraulic circuit for actuating the log feeding mechanism 236 (FIG. 1), the log straightening device 261 (FIG. 1) and the log support 331 (FIG. 1).

The roller support arms 241, 242 of the log feeding mechanism are symbolically indicated in FIG. 35 and shown in their wide open, log accepting condition. Similarly, the forward roller support arms 268, 276 and the rearward roller support arms 267, 274 of the log straightening device 261 (FIG. 1) are symbolically indicated in FIG. 35 and shown in their wide open log accepting positions. The log support 331 and its associated actuating ram 338 are symbolically indicated and shown in a downwardly adjusted condition.

A pump $P_3$ supplies pressure fluid for simultaneously driving the fluid motors $M_2$ of the log feeding rolls 238, 239, and the fluid motors $M_3$ of the log straightening rollers 271, 277. The pump $P_3$ is incorporated in the pump unit 11 (FIG. 1) of the forward vehicle unit, and its discharge is controlled by a manually operable two position valve 484.

A mechanically operable, self-locking two position valve 486 directs flow of pressure fluid from a branch line 487 of the main pressure line 437 selectively either into the gland end or into the barrel end of the ram 251. Fluid flow from and into the barrel end of the ram 251 is further controlled by a two position, spring biased pilot operated valve 488 and a check valve 485. When the valves 486 and 488 are positioned as shown in FIG. 35, fluid pressure in the gland end of ram 251 holds the log feeding rollers in their wide open, log accepting positions. A log turned by rotation of the spider 217 in either direction will therefore be straddled by the open feed rollers. Initial rotation of the spider 217, as already explained, causes the auxiliary line 481 to be pressurized by operation of the valve 478 (FIG. 34), and as a result the self-locking mechanism of the valve 486 will be released and the valve will automatically shift into its feed roller closing position. The shift cylinder 489 of the valve 488 will at that time be pressurized due to the wide open condition of the log straightening device, as will be explained more fully hereinbelow. Accordingly, the ram 251 will expand and urge the rollers 238, 239 against the straddled log as soon as it has lodged itself between them. The motors $M_2$ are preferably kept running continuously, and they will advance the straddled log rearwardly into the open log straightening device.

When the trailing end of the rearwardly moving log clears the feed rollers 238, 239 pressure in the barrel end of the ram 251 will effect a final closing swing of the roller support arms 241, 242. The arm 242 has a mechanical actuating connection 490 with the valve 486, and the roller support arm 241 has a mechanical actuating connection 491 with a two position, self-locking valve 492. The final closing swing of the arm 242 restores the valve 486 to the feed roller open position in which it is shown in FIG. 35; and the final closing swing of the feed roller support arm 241 actuates the valve 492 and thereby initiates closing of the log straightening mechanism.

The valve 492 is shown in FIG. 35 in its released log straightener open position in which it directs pressure fluid from a branch 493 of the main pressure line 437 into the gland ends of the actuating cylinders 279 and 288 for the forward roller support arms 268, 276 and for the rearward roller support arms 267, 274, respectively. At the same time, the valve 492 connects the barrel ends of the rams 279, 288 to sump, and the log straightening device will therefore be in its wide open condition while a log is propelled rearwardly by the feed rollers 238, 239.

The roller support arm 267 of the log straightening device has a lost motion shift connection 494 with a three position self-centered valve 496 which has two functions, namely first, to pressurize the shift cylinder 489 of the valve 488 as long as the log straightening device is in its wide open condition and to depressurize the shift cylinder 489 upon closing of the log straightening device; and second, to initiate a lifting stroke of the log support 331 when a log has been advanced upon it by the drive rollers 271, 277 of the log straightening device.

In the condition of the parts as shown in FIG. 35, pressure fluid is directed from a branch 497 of the main pressure line 437 to the shift cylinder 489 of the valve 488. The pressurized shift cylinder 489 overcomes the spring bias of the valve 488 and holds it in its flow establishing position. The valve 496, when held in the position shown, also depressurizes an auxiliary fluid line 498 which leads to the releasing cylinder 499 of the valve 492.

Final closing swing of the feed roller support arm 241 is transmitted through the actuating connection 491 to the valve 492 and shifts that valve to its self-locking position. As a result, pressure fluid is now directed from the line 493 to the barrel ends of the cylinders 279, 288 and their gland ends are connected to sump. A log which has cleared the feed rollers 238, 239 and which is straddled by the forward and rearward pairs of straightening rollers 273, 278 and 271, 277 will be straightened by lateral thrust which the rollers 273, 278 and 271, 277 will exert upon it under the expanding force of the rams 279 and 288. At the same time, the power driven straightening rollers 271, 277 will propel the straightened log rearwardly until its trailing end clears these rollers.

Initial closing swing of the roller support arm 267 under the expanding force of the ram 288 slackens the lost motion shift connection 494 and as a result, the spring bias on the valve 496 will shift the valve to its center position shortly after the log straightening rollers have started to close in on a straddled log. The shift of the valve 496 to its center position depressurizes the shift cylinder 489 of the valve 488 and the spring bias of that valve will shift it into its blocking position. Accordingly, the log feeding mechanism 236 will be prevented from closing, even if the valve 486 should be shifted to its log feeding position, unless the log straightening device is in its fully opened condition.

Shifting of the valve 496 to its center position maintains the auxiliary fluid line 498 connected to sump, and the rams 279, 288 may therefore continue to expand after the valve 496 has shifted to its center position.

The final closing swing of the roller support arm 267 after the trailing end of the rearwardly moving log has cleared the power driven straightening rollers 271, 277 is transmitted to the valve 496 through the lost motion shift connection 494, and causes shifting of the valve 496 from its center position into a log straightener open position.

Shifting of the valve 496 to the log straightener open position directs pressure fluid from the branch line 497 into the auxiliary line 498 and through the latter into the relaing cylinder 499 of the self-locking valve 492. As a result, flow of pressure fluid to the rams 279, 288 will be reversed and the log straightening device will return to its wide open condition.

The final opening swing of the roller support arm 267 will actuate the lost motion shift connection 494 so as to return the valve 496 to the position shown in which it directs pressure fluid from the line 497 to the shift cylinder 489 of the valve 488. Return of the log straightening device to its open position, therefore, enables the log feeding device to operate in response to release of the valve 486 from its self-locked condition.

The final closing swing of the roller support arm 267 also initiates lifting of the log support 331 by its associated actuating ram 338. Fluid flow from and to the actuating ram 338 is controlled by a pilot operated reversing valve 501. In its support lowered position, as shown in FIG. 35, the valve 501 directs pressure fluid from a branch 502 of the main pressure line 437 to the gland end of the ram 338 while the barrel end of the ram is connected to sump. The shift cylinder 503 of the valve 501 is connected with the auxiliary line 498, and when this line becomes pressurized by a final upward shift of the valve 496 to its log straightener closed position, the valve 501 shifts to its support raising position in which it directs pressure fluid into the barrel end of the ram 338 and connects the gland end of the ram 338 to sump.

The support 331 has a mechanical actuating connection 504 with a spring biased pilot valve 506 for the shift cylinder 508 of the valve 501. The spring bias of the valve 506 causes it to connect the shift cylinder 508 with sump, and when the support 331 arrives at its fully lifted position the actuating connection 504 shifts the valve 506 in opposition to its spring bias into a support lowering position. Pressure fluid then flows from a branch 507 of the main pressure line 437 through the valve 506 to the shift cylinder 508 of the valve 501. As already explained, the opposite shift cylinder 503 of the valve 501 is depressurized while the log straightening device is open, and admission of pressure fluid to the shift cylinder 508 at the end of a lifting stroke of the ram 338 immediately starts a lowering stroke of the ram and brings the support 331 back to its lowered log receiving position. Both shifting cylinders 503 and 508 of the valve 501 remain depressurized until a new log is advanced upon the lowered support 331 by the power driven straightening rollers 271, 277; whereupon the described operating cycle of the lifting ram will repeat itself.

From the foregoing description of FIGS. 33–35 it will be apparent that the automated operating sequence of the delimbing head 77, flying shear 162, log feeding mechanism 236, log straightening device 261 and log lifting mechanisms 331, 338 results in the delivery of logs upwardly into the hopper 302 intermittently at relatively short intervals, as for instance one log every six seconds. After a tree selected for harvesting has been cut at its base and raised to its elevated upright position in the delimbing head it is steadily lowered without stopping until the delimbing head opens automatically and ejects the tree part which has a trunk diameter of less than a desired minimum size, such as four inches. For maximum operating efficiency, a tree may be cut and elevated by manipulation of the tree hoisting boom while a previously cut tree is being processed and transferred into the hopper 302. As soon as the delimbing head opens, a new tree may then be placed into it with a minimum of delay.

FIG. 36 is generally similar to FIG. 34 but shows a modified mechanism for raising and lowering the shear puller 197 relative to the flying shear frame 160. In the modified mechanism the cylinder of the suspension ram 203 is connected at its barrel end to the upper end of the shear puller 197, and the piston rod of the suspension ram has a one-way downward thrust transmitting connection with a hanger bracket 509 which is connected with the flying shear frame 160. In the condition of the parts as shown in FIG. 36 pressure fluid from the branch line 449 is admitted to the gland ends of the lifting ram 184 and of the suspension ram 203, and pressure fluid from the branch line 451 is admitted through the valve 452 to the barrel ends of the lifting ram 184 and suspension ram 203. Accordingly, the shear frame will be urged upward with respect to the forward vehicle frame, and the shear puller will be urged upward with respect to the flying shear frame.

A descending tree bearing upon the abutment plate 196 will transmit downward thrust to the shear frame through the pressure fluid above the piston of the suspension ram 203, and the shoulder of the piston rod bearing upon the hanger bracket 509. Shifting of the valve 453 upon completion of a cutting stroke of the ram 181 causes shifting of the valve 452 into a shear frame and shear puller dropping position in which the barrel ends of the rams 184 and 203 are connected to sump while their gland ends remain connected to the pressure of the main pressure line 437 through the branch 449. Accordingly, the shear puller will drop to provide head room for turning a log standing on the abutment plate 196, and the shear frame will become subjected to downward thrust independently of the descending tree.

The modified actuating mechanism for the shear puller as shown in FIG. 36 facilitates timely application of fluid pressure to the rams 184 and 203.

It should be understood that it is not intended to limit the invention to the herein disclosed forms and details of construction, and that the invention includes such other constructions as are embraced by the scope of the appended claims.

It is claimed and desired to secure by Letters Patent:

1. In a tree harvesting apparatus, the combination of a vehicle frame, tree processing means mounted on said frame and including log transfer means operable to advance a log lengthwise in a horizontal plane; a hopper mounted on said frame and having a bottom opening above said plane; an up and down movable log support mounted on said frame below said hopper and operable to lift a log advanced lengthwise thereupon by said transfer means; and one-way gate means mounted on said frame and adapted to admit a log positioned on and lifted by said log support into said hopper through said bottom opening thereof.

2. A tree harvesting apparatus as set forth in claim 1 comprising two one-way gate assemblies cooperable, respectively, with longitudinally spaced portions of a log lifted by said log support; each of said gate assemblies comprising a pair of cam plates pivotally mounted on said frame for swinging movement toward and away from each other; and resilient means urging said cam plates towards each other; said cam plates presenting cam edges in straddling relation to a log being lifted by said log support, whereby said cam plates may be swung apart to admit a lifted log into said hopper and swing back toward each other under the admitted log.

3. A tree harvesting apparatus as set forth in claim 1 and further comprising a stop gate pivotally mounted on said frame for swinging movement into and out of the path of a log advanced horizontally toward said log support, resilient means urging said stop gate into a log stopping position; and actuating means operatively connected with said log support for swinging said stop gate into a log clearing position by lowering movement of said log support.

4. A tree harvesting apparatus as set forth in claim 1, and further comprising a pair of swingable log supports mounted on said hopper for alternate pivotal transverse movement into and out of a log retaining position below a log lifted by said log support.

5. A tree harvesting apparatus as set forth in claim 4, and further comprising means detachably mounting said hopper on said vehicle frame including stationary catch means on the latter adapted to cooperate with portions of said swingable supports to lock said hopper in log receiving condition on said frame by initial backward swinging movement of said swingable supports from said log retaining position thereof.

6. A tree harvesting apparatus as set forth in claim 5 and further comprising hoist means mounted on said frame including a swingable boom connected with said hopper and operable to move the latter from a log receiving position thereof on said frame into an unloading position in overhanging relation to said frame.

7. In a tree harvesting apparatus, the combination of a vehicle frame, tree processing means mounted on said frame and including log transfer means operable to advance logs lengthwise in a generally horizontal direction; a log storage hopper on said frame having generally upright opposite side members; bottom closure means for said hopper including one-way gate means adapted to yield to sidewise movement of logs into the bottom end of said hopper; and means for urging logs advanced by said transfer means successively sidewise through said gate means into said hopper.

References Cited

UNITED STATES PATENTS

| | | | |
|---|---|---|---|
| 3,385,333 | 5/1968 | Eynon | 144—309 |
| 3,348,592 | 10/1967 | Winblad et al. | 144—3 |
| 3,140,736 | 7/1964 | Propst | 144—3 |
| 3,074,446 | 1/1963 | Earl | 144—3 |
| 2,981,301 | 4/1961 | Busch et al. | 144—3 |

GERALD A. DOST, Primary Examiner

U.S. Cl. X.R.

144—2, 34, 309; 214—3